(12) United States Patent
Dunyak et al.

(10) Patent No.: US 7,474,691 B2
(45) Date of Patent: Jan. 6, 2009

(54) SUB-SYMBOL PARALLEL INTERFERENCE CANCELLATION

(75) Inventors: James P. Dunyak, Lexington, MA (US); John D. Fite, Clifton, VA (US); Jerome M. Shapiro, Belmont, MA (US)

(73) Assignee: The Mitre Corporation, McLean, VA (US)

( * ) Notice: Subject to any disclaimer, the term of this patent is extended or adjusted under 35 U.S.C. 154(b) by 529 days.

(21) Appl. No.: 11/362,111

(22) Filed: Feb. 27, 2006

(65) Prior Publication Data

US 2006/0140259 A1 Jun. 29, 2006

Related U.S. Application Data

(62) Division of application No. 10/765,202, filed on Jan. 28, 2004, now Pat. No. 7,099,378.

(60) Provisional application No. 60/443,655, filed on Jan. 30, 2003.

(51) Int. Cl.
*H04B 1/00* (2006.01)
(52) U.S. Cl. ............... 375/148; 375/144; 375/346; 375/347; 375/348; 375/349; 375/350
(58) Field of Classification Search ........... 375/144, 375/148, 346–350
See application file for complete search history.

(56) References Cited

U.S. PATENT DOCUMENTS

| 5,099,493 | A | 3/1992 | Zeger et al. | |
|---|---|---|---|---|
| 6,442,154 | B1 | 8/2002 | Bottomley | |
| 6,931,052 | B2* | 8/2005 | Fuller et al. | 375/144 |
| 7,324,584 | B1* | 1/2008 | Vigneron et al. | 375/150 |

OTHER PUBLICATIONS

Abrams, B.S. et al., "Efficiently Structured CDMA Receiver With Near-Far Immunity", *IEEE Transactions on Vehicular Technology*, Feb. 1995, 44(1), pp. 1-13.
Dunyak, J. et al., "Multiuser Detection Using Interference Cancellation Technique for CDMA", *Submitted to IEEE WCNC*, 2003.
Dunyak, J. et al., "Multiuser Detection Using Interference Cancellation at Each Chip", *Proceeding of IEEE ISWC*, Sep. 23-24, 2004.
Dunyak, J., "Multiuser Detection of Pulse Amplitude Modulation CDMA Using a Decoupled Kalman Filter Technique", *Submitted to IEEE VTC*, Sep. 24-28, 2002.
Dunyak, J. et al., "A Decoupled Kalman Filter Technique for Multiuser Detection of Pulse Amplitude Modulation CDMA", *Proceedings of the WOC*, Jul. 17-19, 2002.
Dunyak, J. et al., "A Kalman-PIC Multistage Technique to Reduce Multiaccess Interference", *Proceedings of the IEEE ISWC*, Sep. 23-24, 2002.
Flanagan, B, et al., "Performance of a Joint Kalman Demodulator for Multiuser Detection", *Proceedings of the VTC*, Sep. 24-28, 2005.
Lim, T.J. et al., "An Asynchronous Multiuser CDMA Detector Based on the Kalman Filter", *IEEE Journal on Selected Areas in Communication*, Dec. 1998, 16(9), pp. 1711-1722.
Suprin, C. et al., "A Kalman Filter Approach to Joint Channel Estimation and Multiuser Detection", *Submitted to WOC*, Jul. 17-19, 2002.
Verdu, S., "Multiuser Detection", Cambridge University Press, 1998, pp. 1-393.

* cited by examiner

*Primary Examiner*—Curtis B Odom
(74) *Attorney, Agent, or Firm*—Rader Fishman & Grauer PLLC

(57) ABSTRACT

Reduction of multiple access interference, in one example for asynchronous CDMA systems using long codes. In one aspect, parallel interference cancellation (PIC) implements a decoupled estimate, preferably non-linear and applied at chip intervals. According to another aspect, interference is cancelled using a technique that estimates bits for a symbol by interpolating signature waveforms for users to a common sampling lattice of the received data. According to another aspect, multi-stage, hybrid multi-stage, and reconfigurable recursive multi-stage multi-user detection architectures and corresponding processes are provided.

56 Claims, 19 Drawing Sheets

SUB-SYMBOL PARALLEL INTERFERENCE CANCELLATION

RELATED APPLICATION

This application is a divisional of application Ser. No. 10/765,202 filed on Jan. 28, 2004, now U.S. Pat. No. 7,099,378, the contents of which are hereby incorporated in its entirety by reference.

CROSS REFERENCE TO RELATED APPLICATIONS

This application claims the benefit under 35 U.S.C. 119(e) of provisional application 60/443,655, filed Jan. 30, 2003, entitled "Multi-User Detection Techniques for CDMA," the entire contents of which are hereby incorporated by reference.

BACKGROUND OF THE INVENTION

1. Field of the Invention

This invention relates generally to communications, more particularly to improving communication system performance through interference cancellation, and still more particularly to improved cancellation of multiple access interference in a code division multiple access communications environment.

2. Description of the Related Art

Code Division Multiple Access ("CDMA") provides an effective communications technique for several users to share a communications channel. Unfortunately, when the channel becomes overcrowded, the conventional CDMA receiver performs poorly and multiple access interference ("MAI") can severely degrade performance. Although the optimal maximum likelihood receiver in this case is easy to describe, it is nearly impossible to implement.

Various conventional techniques examine interference cancellation at the symbol level. Symbol-level matched filters can provide a sufficient statistic for multi-user detection ("MUD") in an additive white Gaussian noise channel. This well known result concludes that the optimal user bit estimation procedure can be written at the symbol level. Accordingly, these various conventional MUD approaches use symbol-level estimation and cancellation approaches. However, these symbol-level techniques are only approximations to the optimal estimator, and there is no guarantee that these symbol level approximations fully exploit the signal structure.

Additionally, conventional procedures can involve the following computationally expensive process for canceling interference: (1) interpolating the data for each source (base station) to the sampling lattice of the signature waveform (chip center), (2) computing the bit estimates for each user, (3) synthesizing the entire symbol's binary waveform and (4) interpolating the waveform of the whole symbol back to the sampling grid of the data to perform the cancellation.

Some sample-level approaches have been proposed. One example uses a continuous time (i.e., analog) maximum likelihood estimator ("MLE") approach, which can be used as continuous decision feedback. This MLE approach can be purposed as a single-stage analog process using filters controlled by relative user power levels. Although relatively easy to implement, these approaches are not a good theoretical match to the interference cancellation problem. To remedy such shortcomings, linear minimum mean squared error (MMSE) techniques, such as those based on standard applications of the Kalman filter and other least-squares generalizations, could be used to reduce un-cancelled interference. These techniques fully couple the users (resulting in large matrix computations) and perform interference cancellations in the innovation term in the filter. Accordingly, they remain quite computationally expensive.

The above described techniques are also considered to be single stage algorithms. Multiple stage designs have also been considered. For example, in parallel with the development of symbol-level MMSE receivers, multi-stage parallel interference-cancellation (PIC) methods have been developed. In multi-stage PIC formulations, code matched filters are applied to the difference between the receive signal and the sum of the interference signals estimated from the previous stage. These multiple stage designs remain inadequate.

Each of the conventional techniques have been found to either be too complicated to embody in practical applications, or inadequate in terms of actual MAI cancellation in actual usage. Thus, techniques for canceling MAI that can be practically implemented while still providing effective cancellation remain needed.

SUMMARY OF THE INVENTION

The present invention reduces MAI in communications systems, in one embodiment asynchronous CDMA systems using long codes.

One technique uses parallel interference cancellation (PIC) on a chip-by-chip basis. Particularly, a decoupled binary minimum mean squared error (MMSE) estimate is applied for each user at each time sample, instead of waiting for a complete symbol estimate. According to another aspect, the pseudorandom properties of the spreading codes lead to a conditional expectation based on an underlying mixture-of-Gaussians (MG) distribution. This results in performance nearly as high as the single-user bound, even at high loads. Furthermore, these techniques significantly outperform conventional ones at an affordable computational cost.

Another aspect of the present invention cancels multiple user interference in a communications system wherein a plurality of users communicate over a shared channel by receiving a set of data (e.g., baseband data) that provides a plurality of discrete values produced at a sub-symbol interval that is less than a full symbol period, and estimating bits for a symbol corresponding to a given user by interpolating the signature waveforms for at least some of the plurality of users to a common sampling lattice of the received set of data. This aspect can be applied to various MUD approaches including the Mixed Gaussian Demodulator, PIC, partial PIC, and the Decoupled Kalman Demodulator and provides a substantial reduction in complexity since the interpolation of the binary signature waveforms can be performed easily with lookup tables, whereas the interpolation of each source to chip center requires filtering operations involving traditional multiply-accumulate structures.

Other aspects of the present invention include hybrid multi-stage multi-user detection (MUD) methods and a reconfigurable Recursive Multi-Stage MUD (RMSM) algorithm architecture that, through the selection of an update gain factor and a non-linear function, can implement various MUD algorithms. MUD algorithms supported by the RMSM architecture include the Mixed Gaussian Demodulator, PIC, Partial PIC, Decoupled Kalman Demodulator, and hybrid multi-stage MUD methods.

The present invention can be embodied in various forms, including computer implemented methods, computer program products, communications systems and networks, receivers, transmitters and transceivers, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Figure 1:
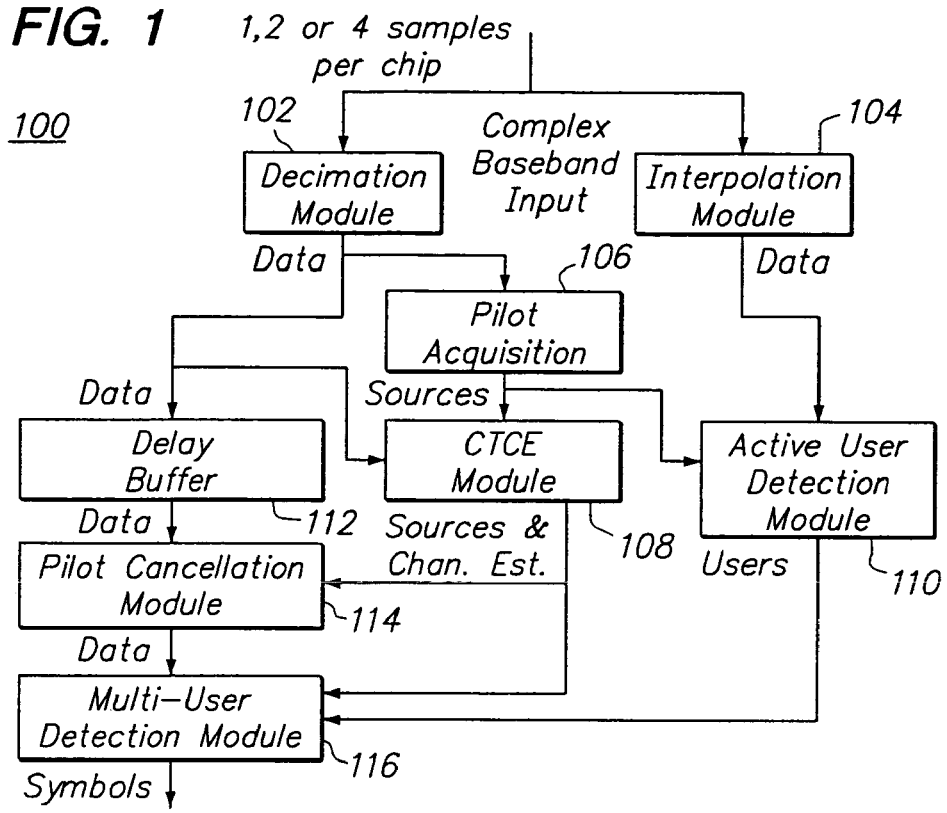
FIG. 1 is a schematic diagram illustrating an embodiment of a receiver.

In the following description, for purposes of explanation, numerous details are set forth, including particular equations, in order to provide an understanding of one or more embodiments of the present invention. However, it is and will be apparent to one skilled in the art that certain specific details are not required in order to practice the present invention. For example, the details of one aspect of the invention may not be required to practice another aspect of the present invention. For ease of description, the description is separated into separate sections pertaining to various aspects of the present invention.

As indicated, each aspect of the present invention can be embodied in various forms, including computer implemented methods, computer program products, communications systems and networks, receivers, transmitters and transceivers, and the like. For example, in one embodiment a hand held device such as a cellular telephone includes conventional memory, as well as a processing unit for executing instructions provided in memory. Conventional programming techniques are used to implement the various techniques described in detail in the following sections, as provided by software that can be stored in the memory. Alternatively, the same software can be stored on various computer readable media (e.g., disks, CDs, etc.). Still further, when the instructions provided by the software are executed, computer implemented processes result.

According to one aspect, the present invention provides multi-user detection (MUD) techniques that may be used in a CDMA communications system. The MUD techniques receive complex baseband discrete time input, implement parallel interference cancellation (PIC), and perform estimations at a sub-symbol level, preferably on a chip-by-chip basis. In a receiver (e.g., CDMA, cell phone), these techniques improve performance by minimizing the potential for multiple access interference, and do so at relatively low computational cost. According to additional aspects, the MUD techniques implement recursive multistage based estimation and non-linear functions to further improve interference cancellation when compared with linear and single stage techniques.

In one embodiment, the present invention implements with the users coupled only through the interference cancellation, which occurs on a discrete sub-symbol sampling lattice. By way of introduction, FIGS. 13-15 describe a DS-CDMA implementation using the received signal model $$y(t) = \sum_{p=1}^{P} y_p(t) + \sum_{k=1}^{K} h_k(t)c_k(t) + v(t),$$

with y(t)=the complex received baseband signal, $h_k(t)$=the complex asynchronous spreading functions (which can also be referred to as signature waveforms), $c_k(t)$=the complex transmitted constellation symbol associated with the K users, and v(t)=the complex additive white Gaussian noise. This formulation allows, if necessary, for the presence of signals $y_p(t)$ which contain known signals such as pilots, preambles, midambles, and so on. These $y_p(t)$ allow for the acquisition of coherent channel information, timing, and so on as is standard in the art. The discrete sampling interval, the time between t and t+1, is less than a symbol period and generally less than or equal to a chip period.

Figure 13:
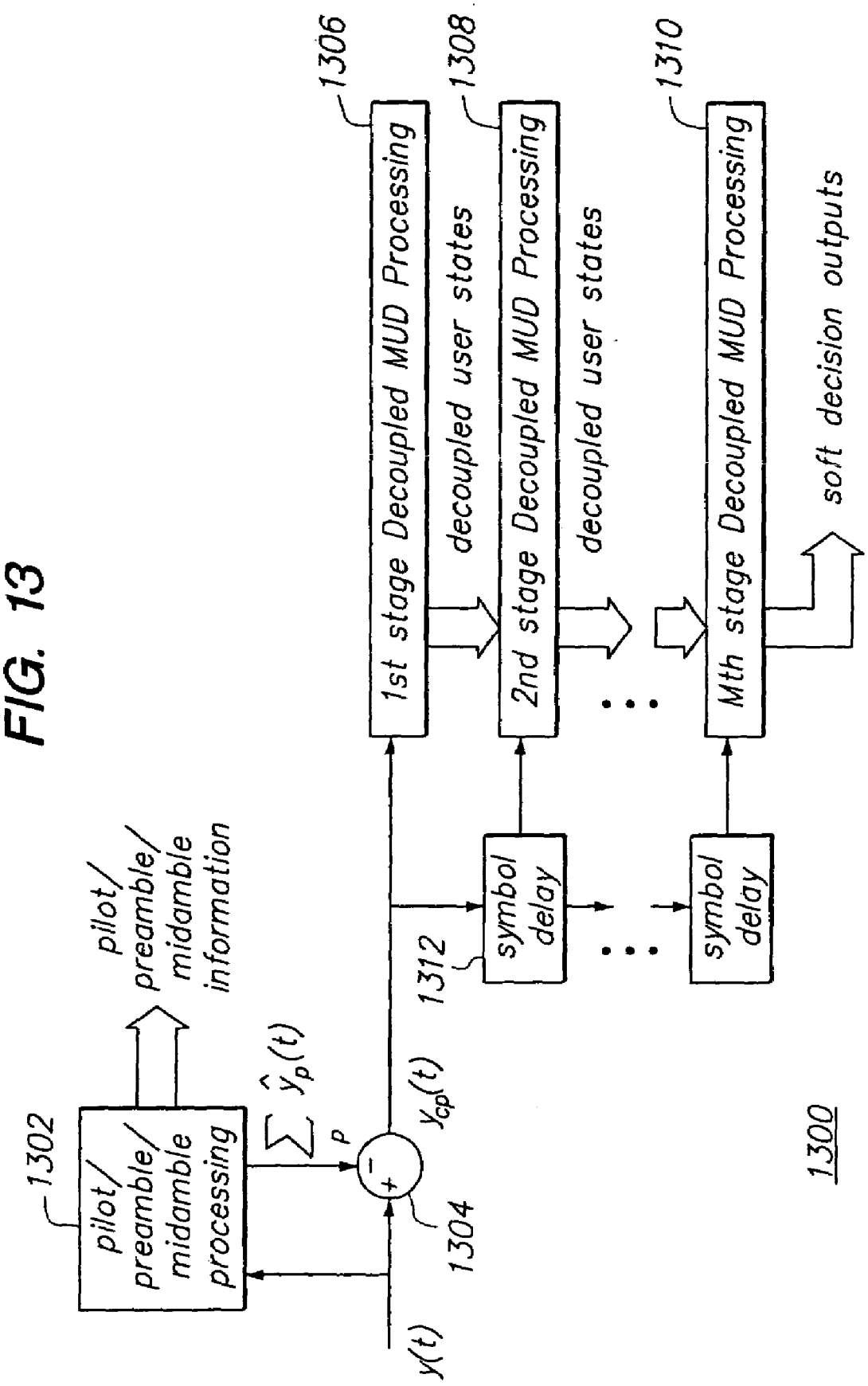
FIG. 13 is a schematic diagram illustrating an embodiment of multiple stage decoupled MUD processing.
Figure 14:
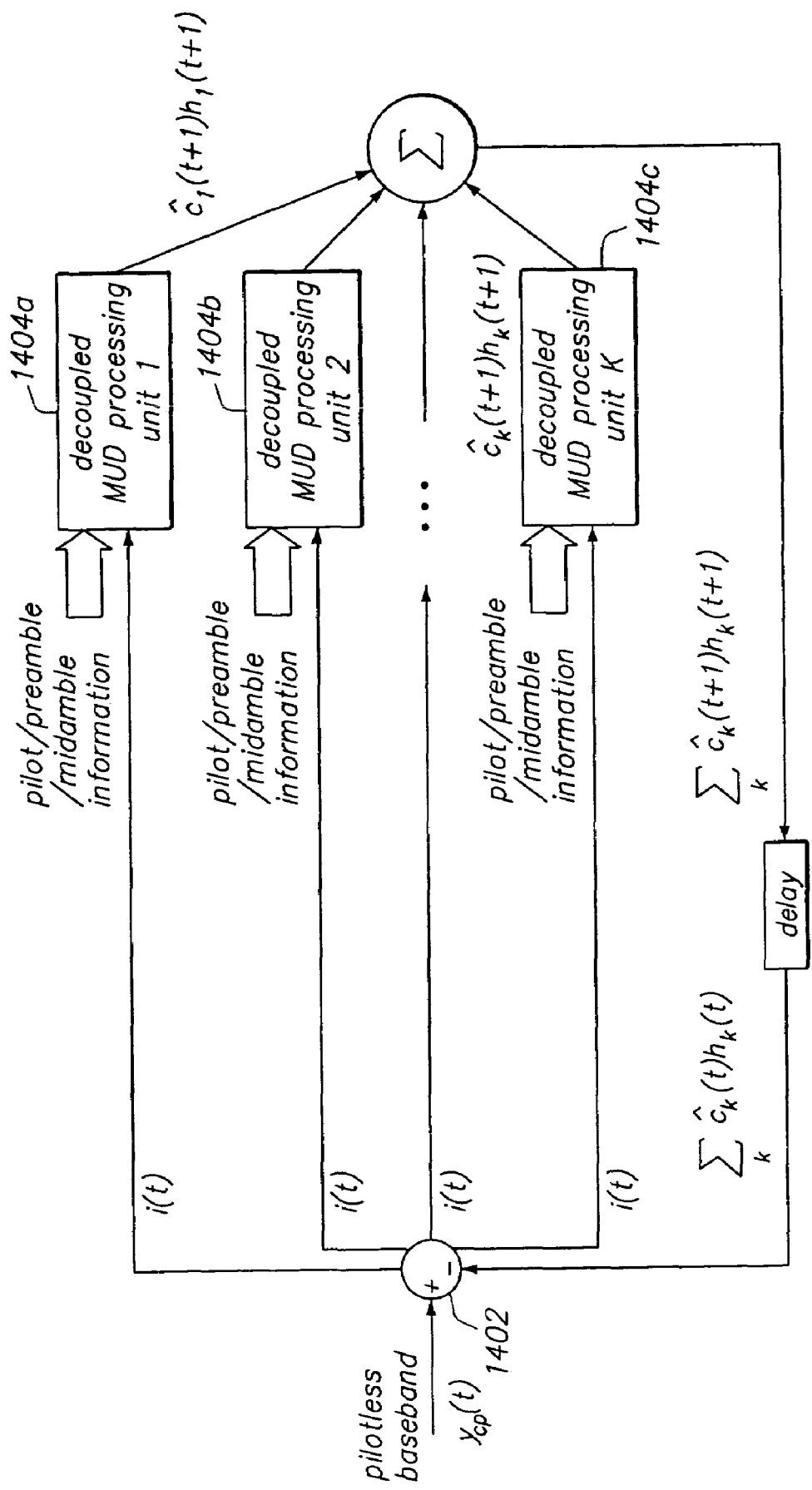
FIG. 14 is a schematic diagram illustrating an embodiment of a stage of decoupled MUD processing.
Figure 15:
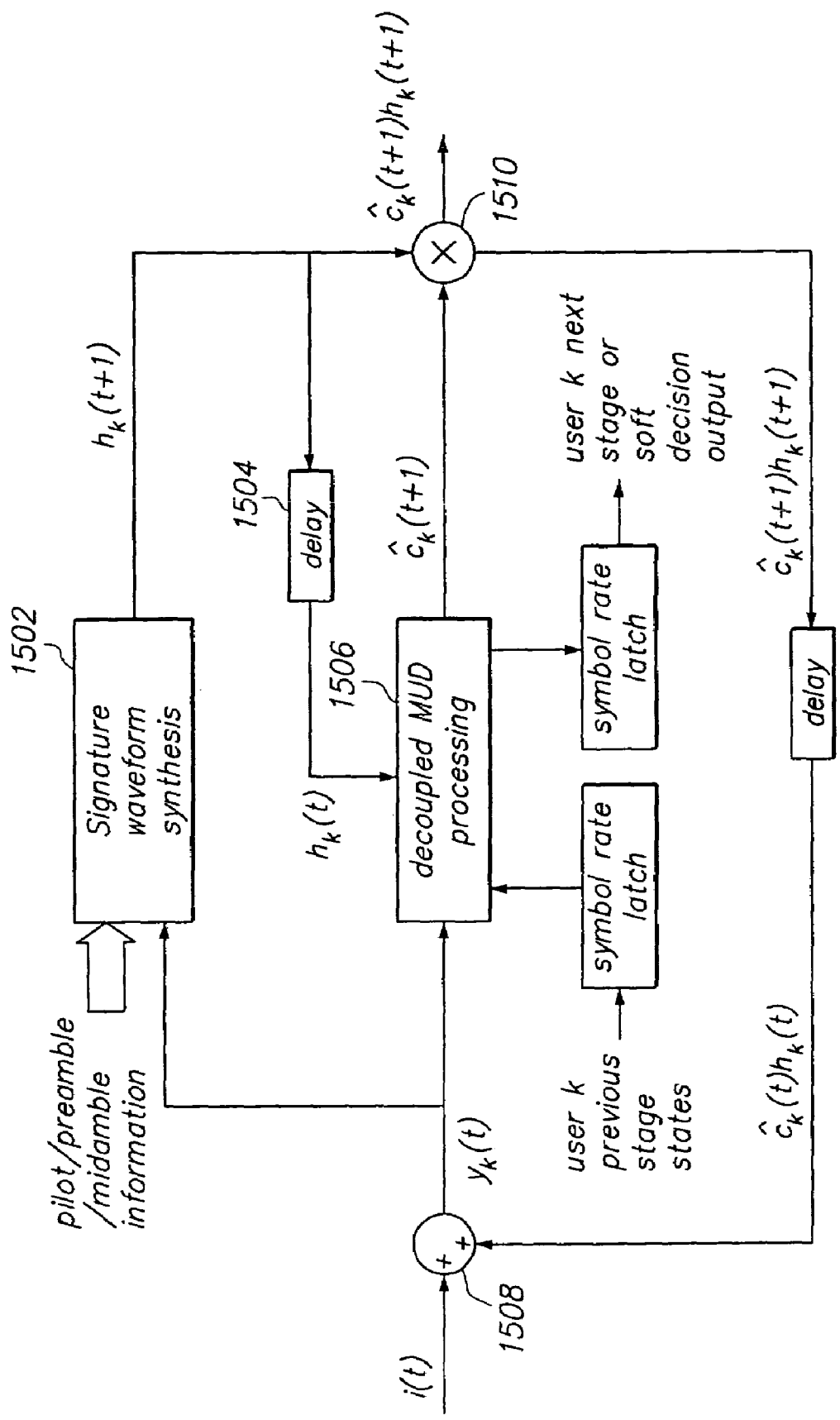
FIG. 15 is a schematic diagram illustrating an embodiment of a decoupled MUD processing element.

FIGS. 13-15 are schematic diagrams that respectively illustrate multiple stage decoupled MUD processing 1300, a single stage of MUD processing 1400 in more detail, and MUD processing element 1500 in still more detail. The schematic diagrams illustrate both the flow of such processing as well as an embodiment of modular architecture for the same.

FIG. 13 illustrates an embodiment of multiple stage decoupled MUD processing 1300, particularly showing how pilot interference is cancelled and then applied in a multistage setting (other implementations can use one stage). The multiple stages may apply the same decoupled MUD algorithm, or, in a hybrid setting, may use different MUD algorithms for the different stages. In one implementation, which is most useful when only limited computational resources are available, a first stage of MG-MUD is followed by a second stage of conventional PIC, which is itself efficiently implemented using the architecture in FIG. 15. In FIG. 13, first pilot, preamble, and midamble information is processed 1302, if present. Information such as timing and channel equalization is shared with other blocks as needed, since in many settings multiple users will share pilots. The pilot/preamble/midamble signals are also reconstructed and used to cancel 1304 their contribution to multi-access interference, resulting in $y_{cp}(t)$, the baseband signal after cancellation of pilots. This signal is provided to the first stage of decoupled MUD 1306, which estimates $\hat{c}_k(t)$ and other user state information as needed to provide transformation between stages. This process is described in more detail in FIG. 14. With a one symbol delay 1312, the $1^{st}$ stage symbol estimates (and supporting data) are used to seed the $2^{nd}$ stage MUD 1308, and so on. The final stage MUD 1310 provides the soft decision outputs.

Here, the pilot information is estimated and the pilot signal is cancelled before user multi-access interference is estimated and removed. This is suggested when the pilots are strong enough to estimate the needed information. In some cases, the pilot information should be re-estimated and pilot signals re-cancelled after the intermediate stages of interference cancellation. This is advantageous, for example, when near-far problems cause weak pilots to be obscured by strong pilots and user signals.

FIG. 14 illustrates an embodiment of a stage of MUD processing 1400. Based on estimates $\hat{c}_k(t)$ of the constellation symbol, the interference cancellation is achieved by subtracting 1402 the current interference estimate from the pilot-less baseband signal to form i(t), the innovation signal. This innovation signal represents the original signal y(t) with all known multi-access interference removed. The separate MUD processing units are coupled only through this interference cancellation; inside of MUD processing units, the contribution of the uncancelled interference from other users is viewed as additive noise. Scalar equations for each MUD processing unit then result, in contrast to the standard Kalman filter approach which results in large matrix equations.

The interference cancellation occurs on the discrete sub-symbol sampling lattice, instead of using interpolation to move these measurements to chip center for each user or using symbol-level sampling. The decoupled processing units 1404a-c use i(t) and any pilot/preamble or midamble information to produce an estimate $\hat{c}_k(t+1)h_k(t+1)$ for this user's contribution to MAI at the next sample time.

FIG. 15 illustrates an embodiment of a decoupled MUD processing element 1500. Again, the coupling of separate users' processing units occurs through the innovation i(t), and the signal reconstruction $\hat{c}_k(t+1)h_k(t+1)$ occurs at the discrete sub-symbol timescale which is common for each user's processing unit. The signature waveform synthesis module 1502 uses equalization and timing information, if available, from embedded pilots, preambles, midambles, and so on. Through application of a one time step delay 1504, the decoupled MUD processor 1506 and signal reconstruction 1510 share a single calculation of $h_k(t+1)$. The decoupled MUD Processor 1506 uses its internal state information and the new measurement $$y_k(t) = y(t) - \sum_{p=1}^{P} \hat{y}_p(t) - \sum_{l=1, l \neq k}^{K} h_l(t)\hat{c}_l(t) + v(t)$$

to make an estimate of the constellation symbol $\hat{c}_k(t+1)$. The addition 1508 of the estimated multi-access interference $\hat{c}_k(t)$ $h_k(t)$ restores the contribution of user k and simplifies the algorithm flow to produce $y_k(t)$ in the decoupled MUD processing. Although one embodiment is described, other functionally equivalent designs can be used for FIGS. 14-15.

Another aspect of this invention is that the residual term $$\sum_{p=1}^{P} (y_p(t) - \hat{y}_p(t)) + \sum_{l=1, l \neq k}^{K} h_k(t)(c_k(t) - \hat{c}_k(t)) + v(t)$$

is viewed as additive noise during signal processing, which leads to substantial savings in computational complexity when compared to standard Kalman filtering and other fully coupled techniques. The internal states of the decoupled processor maintain the information needed to generate an estimate of the constellation point $\hat{c}_k(t)$ at each sub-symbol time step t. The decoupled MUD processor block produces an estimate at each t, instead of waiting until the end of a symbol period. This significantly improves cancellation at each pass (as in the Mixed Gaussian MUD embodiment discussed below) and improves computational efficiency by allowing reuse of signature waveforms for both demodulation and reconstruction even when applying more traditional algorithms (such as classic parallel interference cancellation) in the decoupled MUD processor. In the signature waveform synthesis module 1502, the signature waveform is interpolated to the sub-symbol sampling lattice of the data, rather than interpolating the data $y_k(t)$ to a user k-based sampling grid, such as chip center. This produces a substantial reduction in complexity in many cases, since the $h_k(t+1)$ interpolation can often be implemented with binary lookup tables, in contrast to fixed point filters for interpolating $y_k(t)$ to a different chip center grid for each user.

In one embodiment, these aspects can be implemented through what is referred to as a Mixed Gaussian (MG) multi-user demodulator (referred to as MG-MUD), which implements a non-linear minimum mean square error estimation technique, full decoupling, and multiple stages to estimate and cancel interference on a sub-symbol basis, preferably on a chip-by-chip basis. Other embodiments include the Decoupled Kalman Demodulator and the Decoupled Kalman Demodulator with nonlinear refinement, which are described further in provisional application 60/443,655, filed Jan. 30, 2003, entitled "Multi-User Detection Techniques for CDMA." The architecture in FIG. 15 also provides an advantageous implementation for other prior MUD techniques which update the symbol estimate only on the symbol boundary.

Although applicable to any communication methodology, MG-MUD is described in connection with a CDMA system for ease of discussion. The technique uses decoupled filters to estimate symbols for each user while accomplishing parallel interference cancellation on a sub-symbol basis. A minimum mean squared error estimate is made at each time sample, and interference cancellation is performed without waiting for the complete symbol. Decoupling is accomplished through the pseudorandom properties of the spreading codes, resulting in an algorithm with excellent performance even in the presence of high levels of multi-access interference.

By way of introduction, the MG-MUD technique is first described, followed by particular embodiments implementing the technique.

By way of example, a model using the IS95 standard with a Binary Phase Shift Keyed (BPSK) CDMA signal for K asynchronous traffic channels using long codes is described. Consider the received signal $$y(t) = \sum_{l=1}^{K} h_l(t) A_l b_l(t) + v(t),$$

with $y(t)$=the complex received signal, $h_l(t)$=the complex asynchronous spreading functions, $A_l(t)$=the real traffic channel magnitude, $b_l(t)$=the transmitted bit, and $v(t)$=the complex additive white Gaussian noise. Note, in this formulation, that the spreading function contains the channel effects, while the traffic channel magnitude is separated to simplify traffic channel power tracking (relative to the pilot) in the IS95 embodiment described below. In the presence of resolvable multipath, a formulation similar to the rake receiver is employed. In this case, each arrival is tracked separately during MUD, with the separate measurements of a user's arrivals coherently combined when making the MMSE estimate.

Here, the phase of the channel coefficient in the spreading functions and the amplitude in the channel magnitude are estimated using standard techniques, and the channel coefficient is assumed to be approximately constant over a single symbol period.

For user k, consider a MMSE estimate $\hat{b}_k(t)$ of $b_k(t)$ with $\sigma_k^2(t) = E(|\hat{b}_k(t) - b_k(t)|^2)$.

The demodulator uses a predictor-corrector structure similar to a Kalman filter that implements interference cancellation through the innovation signal. Consider $h_k(t)$ and $A_k(t)$ to be known, and let $\hat{b}_k(t)^-$ be the prediction of $b_k(t)$ based on $\hat{b}_k(t-1)$. Then $$\hat{b}_k(t)^- = \begin{cases} \hat{b}_k(t-1) & \text{if no symbol transition occurs} \\ & \text{for user } k \text{ in } (t-1, t] \\ 0 & \text{otherwise} \end{cases} \quad (1)$$

and $$\sigma_k^2(t)^- = \begin{cases} \sigma_k^2(t-1) & \text{if no symbol transition} \\ & \text{occurs for user } k \text{ in } (t-1, t]. \\ A_k^2 & \text{otherwise} \end{cases}$$

The demodulator is developed for a fixed user k. For notational convenience, assume that the user k starts a new symbol in the sampling interval immediately before $t=0$. First, cancel the estimated multi-access interference, defining:

$$i(t) = y(t) - \sum_{l=1}^{K} h_l(t) A_l \hat{b}_l(t)^- \quad (2)$$

and $$i_k(t) = i(t) + h_k(t) A_k \hat{b}_k(t)^-,$$

so $$i_k(t) = h_k(t) A_k b_k(t) + \sum_{l \neq k} h_l(t) A_l (b_l(t) - \hat{b}_l(t)^-) + v(t).$$

Consider sampling at the chip rate and make an MMSE estimate of $b_k(t)$ based on the vector of measurements:

$$\tilde{i}_k(\tau) = Re\{h_k(\tau)^* i_k(\tau)\}$$

with $\tau = 1, 2, \ldots, t$ and $0 \leq t <$ the spreading gain. Note that the estimate for $b_k(t)$ depends on all measurements of the current symbol up to time t. The estimate at the end of the symbol is the converged estimate. For the BPSK case, the imaginary component of $h_k(\tau)^* i_k(\tau)$ also contains limited information that does not necessarily need to be exploited. Next used are the pseudorandom properties of the spreading codes sampled once per chip. Then, for user k, the other users' spreading functions are considered to be random variables, and $h_l(t)$ is approximated as independent and identically distributed with $$E(h_l(t)) = 0,$$

$$E(h_l(t)^* h_l(t)) = H^2,$$

$$E(h_k(t)^* h_l(s)) = 0 \text{ for } k \neq l,$$

and $$E(h_l(t)^* h_l(s)) = 0 \text{ for } t \neq s.$$

The relative power of the users is captured in the real magnitude $A_l$. Liberal application of the central limit theorem results in conditionally Gaussian distributions $$\tilde{i}_k(\tau)_{|b_k(t)} \approx N\left(h_k(\tau)^* h_k(\tau) A_k b_k(t), 1/2 h_k(\tau)^* h_k(\tau)\left(H^2 \sum_{l \neq k} A_l^2 \sigma_l^2(\tau)^- + \sigma_v^2\right)\right)$$

From the pseudorandom properties of the spreading functions, it is expected that $\tilde{i}_k(\tau_1)_{|b_k(t)}$ and $\tilde{i}_k(\tau_2)_{|b_k(t)}$ will be approximately uncorrelated for $\tau_1 \neq \tau_2$. The joint density of $\tilde{i}_k(\tau)_{|b_k(t)}, \tau = 1, 2, \ldots t$, is then a product density and the density of $\tilde{i}_k(\tau)$ is a mixture of two Gaussians. By straightforward calculation, the minimum mean squared error estimate is then the conditional expectation and $$\hat{b}_k(t) = \tanh\left(\sum_{\tau=0}^{t} \frac{Re(h_k(\tau)^* i_k(\tau)) A_k}{1/2\left(H^2 \sum_{l \neq k} A_l^2 \sigma_l^2(\tau)^- + \sigma_v^2\right)}\right) \quad (3)$$

$$\sigma_k^2(t) = G\left(\sum_{\tau=0}^{t} \frac{h_k(\tau)^* i_k(\tau) A_k^2}{1/2\left(H^2 \sum_{l \neq k} A_l^2 \sigma_l^2(\tau)^- + \sigma_v^2\right)}\right) \quad (4)$$

with special function G defined by $$G(\Lambda) = \frac{1}{2\sqrt{2\pi\Lambda}} \int_{-\infty}^{+\infty} (1 + \tanh(w))^2 \exp\left(-\frac{(w+\Lambda)^2}{2\Lambda}\right) + \quad (5)$$

$$(1 - \tanh(w))^2 \exp\left(-\frac{(w-\Lambda)^2}{2\Lambda}\right) dw.$$

This section introduces an approximation that substantially reduces the computational load, while improving demodulator performance. To simplify the demodulator, consider the approximation $$H^2 \sum_{l \neq k} A_l^2 \sigma_l^2(\tau)^- + \sigma_\nu^2 \approx H^2 \sum_{l=1}^{K} A_l^2 \sigma_l^2(\tau)^- + \sigma_\nu^2.$$

This approximation is quite accurate for lower-powered users. Higher-powered users are easily demodulated and not significantly affected. Defining $$\sigma_i^2 = E(i(t)^* i(t)) = H^2 \sum_{l=1}^{K} A_l^2 \sigma_l^2(\tau)^- + \sigma_\nu^2 \qquad (6)$$

allows estimation of the denominator in equation (3) directly from the time series. A simple low pass filter $$\hat{\sigma}_i^2(t) = (1-\alpha)\hat{\sigma}_i^2(t-1) + \alpha i(t)^* i(t) \qquad (7)$$

can be used,
but in a specific application the filter should be more closely matched to the dynamics of the channel. The resulting demodulator for stage 1 of a multi-stage approach is then simply $$\hat{b}_{k1}(t)^- = \begin{cases} \hat{b}_{k1}(t-1) & \text{if no symbol transition} \\ & \text{occurs for user } k \text{ in } (t-1, t] \\ 0 & \text{otherwise} \end{cases} \qquad (8)$$

$$i_1(t) = y(t) - \sum_{l=1}^{K} h_l(t) A_l \hat{b}_{l1}(t)^- \qquad (9)$$

$$\hat{\sigma}_{i1}^2(t) = (1-\alpha)\hat{\sigma}_{i1}^2(t-1) + \alpha i_1(t)^* i_1(t) \qquad (10)$$

$$S_{k1}(t) = \frac{2 A_k}{\hat{\sigma}_{i1}^2(0)} \times \sum_{\tau=0}^{t} \text{Re}\left(h_k(\tau)^* i_1(\tau)\right) \qquad (11)$$

$$\hat{b}_{k1}(t) = \tanh(S_{k1}(t)). \qquad (12)$$

Equations (6-10) consider the case when no resolvable multipath is present. When multiple arrivals occur, the arrivals are tracked separately and information from these arrivals is coherently combined. For a user k with $P_k$ multipath arrivals, equations (6-10) then become $$\hat{b}_{k1}(t)^- = \begin{cases} \hat{b}_{k1}(t-1) & \text{if no symbol transition} \\ & \text{occurs for user } k \text{ in } (t-1, t] \\ 0 & \text{otherwise} \end{cases}$$

$$i_1(t) = y(t) - \sum_{l=1}^{K}\sum_{p=1}^{P_l} h_{lp}(t) A_{lp} \hat{b}_{lp1}(t)^-$$

$$\hat{\sigma}_{i1}^2(t) = (1-\alpha)\hat{\sigma}_{i1}^2(t-1) + \alpha i_1(t)^* i_1(t)$$

$$S_{k1}(t) = \sum_{p=1}^{P_k}\left[\frac{2 A_k p}{\hat{\sigma}_{i1}^2(0)} \sum_{\tau=0}^{t} \text{Re}\left(h_{kp}(\tau)^* i_1(\tau)\right)\right]$$

$$\hat{b}_{k1}(t) = \tanh(S_{k1}(t)).$$

The case of a single arrival per traffic channel is illustrated in the embodiment below.

To provide a straightforward demonstration, the above theoretical development provides the MGMUD approach for a BPSK system. In the BPSK case, the bits are directly estimated. Modulations with more complicated constellations require a different approach. This different approach is also used in mixed modulation cases, in which different users may have different modulation constellations. Consider the received signal $$y(t) = \sum_{l=1}^{K} h_l(t) A_l c_l(t) + v(t),$$

with y(t)=the complex received signal, $h_l(t)$=the complex asynchronous spreading functions, $A_l(t)$=the real traffic channel magnitude, $c_l(t)$=the complex transmitted constellation symbol, and v(t)=the complex additive white Gaussian noise.

For user k with constellation set C, we can maximize interference cancellation by making a mean squared error estimate of the constellation state $c_k$ for this user, in contrast to the BPSK bit estimate. For complex innovation i(t), we have the MMSE estimate from the approximate conditional expectation $$\hat{c}_k(t) = \frac{\sum_{c_i \in C} c_i \exp\left(\sum_{\tau=0}^{t} -\frac{|i(\tau) + h_k(\tau) A_k \hat{c}_k(\tau)^- - c_i A_k h_k(\tau)|^2}{\hat{\sigma}_i^2}\right)}{\sum_{c_i \in C} \exp\left(\sum_{\tau=0}^{t} -\frac{|i(\tau) + h_k(\tau) A_k \hat{c}_k(\tau)^- - c_i A_k h_k(\tau)|^2}{\hat{\sigma}_i^2}\right)} \qquad (13)$$

with $\sigma_i^2$ and its estimate $\hat{\sigma}_i^2$ defined using the same approach as in equations (6) and (7) below. The contribution of this user for interference cancellation is then, just as in BPSK, $\hat{c}_k(t) A_k h_k(t)$.

Equations (1-5) implement the BPSK demodulator, while (13) describes the demodulator for a multiple bit constellation. Both the hyperbolic tangent, special function G, and other exponential functions may be implemented as a table lookup for numerical efficiency, in which case equations (3) and (4) can be efficiently implemented through the accumulation of the summations. They may also be approximated, such as in the piecewise-linear approximation demonstrated in the embodiment below. Multiple passes are then performed by repeatedly passing through the data and continuing to accumulate terms in the summations in equations (2) and (3).

Equations (8-12) describe the first pass of the algorithm, which is indicated by the subscript 1 in the parameters. Remember that for notational convenience these equations are for a user k starting a new symbol at time t=0 and for $0 \leq t <$ the spreading gain. The summation in equation (9) restarts at each symbol boundary. In this formulation, the estimate of $\sigma_i^2$ used in equation (9) is fixed. Use of equations (8-12) provides another significant benefit, in that the algorithm is less model-driven and provides a more robust demodulator. The algorithm needs no estimate for the power of the additive noise, which is often difficult to estimate during heavy multi-access interference. In addition, the algorithm is no longer heavily dependent on the accuracy of the error variance dynamics in equations (4) and (5). Numerical experiments reveal that the additive noise approximation approach, as described in equations (8-12), leads to higher-fidelity approximations in the MMSE estimation.

Several choices are available for implementing a multiple pass algorithm. For example, we may first use the earlier pass bit estimate and summations as an initial condition. For spreading gain L and user k, define $F_k(t)$ to be the time index of the first sample of the current symbol for user k. Then, for example, the first sample of a symbol for user k is $$F_k(t_{start}) = t_{start}$$

and for the remaining samples in the symbol $$F_k(t) = t_{start} \text{ for } t_{start} \leq t < t_{start} + L - 1.$$

We can then write multipass equations for pass m as $$\hat{b}_{k\,0}(t) = 0 \text{ for all } t \quad (14)$$

$$S_{k\,0}(t) = 0 \text{ for all } t \quad (15)$$

$$\hat{b}_{k\,m}(t)^- = \begin{cases} \hat{b}_{k\,m}(t-1) & \text{if no symbol transition} \\ & \text{occurs for } k \text{ in } (t-1, t] \\ \hat{b}_{k\,m-1}(t+L-1) & \text{otherwise} \end{cases} \quad (16)$$

$$i_m(t) = y(t) - \sum_{l=1}^{K} h_l(t) A_l \hat{b}_{lm}(t)^- \quad (17)$$

$$\hat{\sigma}_{i\,m}^2(t) = (1-\alpha) \hat{\sigma}_{i\,m}^2(t-1) + \alpha\, i_m(t)^* i_m(t) \quad (18)$$

$$S_{k\,m}(t) = S_{k\,m-1}(F_k(t) + L - 1) + \frac{2A_k}{\hat{\sigma}_{i\,m}^2(F_k(t))} \times \sum_{F_k(t)}^{t} \text{Re}\left(h_k(\tau)^*\left(i_m(\tau) + h_k(\tau) A_k \hat{b}_{k\,m}(\tau)^-\right)\right) \quad (19)$$

$$\hat{b}_{k\,m}(t) = \tanh(S_{k\,m}(t)) \quad (20)$$

Equations (14-20) show how new symbols are handled at each pass. The slightly complicated time-indexing schemes in equations (16) and (19) simply restart the bit estimate and accumulator at converged estimates for the earlier pass whenever a symbol boundary is reached.

The multi-pass implementation in equation (19) continuously accumulates between passes. To maintain the interpretation of converged symbol estimates as log likelihoods, as preferred in decoding, we may alternately use $$S_{k\,m}(t) = S_{k\,m-1}(F_k(t) + L - 1) + \frac{2A_k}{\hat{\sigma}_{i\,m}^2(F_k(t))} \times \sum_{F_k(t)}^{t} \text{Re}\left(h_k(\tau)^*\left(i_m(\tau) + h_k(\tau) A_k \hat{b}_{k\,m}(\tau)^-\right)\right) - \frac{L - (t - F_k(t) + 1)}{L} S_{k\,m-1}(F_k(t) + L - 1). \quad (21)$$

This function linearly removes the initial condition in the accumulator. A third approach is to save all of the matched filter values $$\frac{2A_k}{\hat{\sigma}_{i\,m}^2(F_k(t))} \text{Re}\left(h_k(\tau)^*\left(i_m(\tau) + h_k(\tau) A_k \hat{b}_{k\,m}(\tau)^-\right)\right)$$

in a circular buffer, which is filled with data from the symbol as the new data is available. The entire buffer is then summed at each time step. In this case, $$S_{k\,m}(t) = \frac{2A_k}{\hat{\sigma}_{i\,m}^2(F_k(t))} \sum_{F_k(t)}^{t} \text{Re}\,(h_k(\tau)^* \left(i_m(\tau) + h_k(\tau) A_k \hat{b}_{k\,m}(\tau)^-\right)) + \frac{2A_k}{\hat{\sigma}_{i\,m-1}^2(F_k(t))} \sum_{t+1}^{F_k(t)+L-1} \text{Re}\,(h_k(\tau)^*\left(i_{m-1}(\tau) + h_k(\tau) A_k \hat{b}_{k\,m-1}(\tau)^-\right)). \quad (22)$$

In practice, equation (22) would be implemented by subtracting the old term and adding the new term. Each of the three techniques (19), (21) and (22) provide increased accuracy in estimating the bit log likelihoods at the cost of increased implementation complexity.

Thus, described herein is a practical multi-user detection technique for high user loads. Through decoupled filters based on the underlying mixed Gaussian distributions, the technique cancels interference on a chip-by-chip basis instead of waiting for a complete symbol estimate. Further numerical efficiency results from estimating the un-cancelled interference power from the time series itself, instead of using a model-based approach. This technique compares favorably to an optimized partial PIC algorithm using the IS95 standard. This embodiment illustrates various features of the invention. First, the separate MUD processor blocks are coupled only through the interference cancellation. Second, this interference cancellation occurs on the data sampling lattice (as compared to individual user chip center or the symbol level lattice) using the sub-symbol level structure introduced in FIG. 15 Finally, the interference cancellation begins at a sub-symbol level, without waiting for demodulation of a complete symbol as in the prior MUD art.

Another aspect of the present invention is provision of hybrid multi-stage (or multi-pass) MUD techniques that use different sample-level methods at each stage as introduced in FIG. 13. The various MUD techniques described above can, for example, be respectively used as the differing sample-level methods. Alternatively, a hybrid solution could include the use of a DKD or MG-MUD first stage followed by a conventional Partial Parallel Interference Cancellation (PPIC). In one embodiment, the hybrid solution allows each stage to consist of a different method (e.g. DKD, MG-MUD, PIC, PPIC). To accommodate computational efficiency, the current stage preferably includes functions that compute the ancillary method-specific parameters needed by the next stage.

FIG. 1 is a schematic diagram illustrating an embodiment of a CDMA communications receiver (SSCR) 100 and corresponding processes. The SCCR 100 includes a decimation module 102, interpolation module 104, pilot acquisition module 106, code tracking and channel estimation (CTCE) module 108, active user detection module 110, delay buffer 112, pilot cancellation module 114, and multi-user detection (MUD) module 116

Although the present invention is applicable to various communications systems, for ease of description some example are described in the context of usage with the IS95B CDMA standard. The input to the SSCR 100 is a digitized complex baseband signal where the sampling rate of the signal can be at any integer multiple (usually 1, 2 or 4) times the chipping rate, which in the case of IS95 is 1.2288 million chips per second. For the system described, a version of the signal digitized at 1 sample of chip is needed as is a version sampled at a rate of at least 4 samples per chip. If the input is clocked at 4 samples per chip, then the decimation module 102 uses conventional decimation techniques to obtain a version clocked at 1 sample per chip. If the input is clocked at 2 samples per chip, then the interpolation module 104 uses conventional interpolation techniques to generate a version sampled at 4 samples per chip as is used by the active user detection module 110, with decimation being used to generate a version sampled at 1 sample per chip for use by the rest of the system. Finally, if the input is sampled a 1 sample per chip as in the figure, then interpolation is used to generate a version at 4 samples per chip.

With reference to the pilot acquisition module 106, each CDMA base station (called a source) emits a pilot signal that is used for acquisition of code timing. In IS95B, the pilot signal uses a repeating 32768 chip code sequence. Each base station has a different timing offset from its neighbors. In the pilot acquisition module 106, the number of sources, and their timing offsets, and optionally Doppler offsets are estimated. In the exemplar system, timing offsets accurate to $\frac{1}{16}$ of a chip are used. Additionally, a preliminary estimate is made of the complex amplitude of the channel. The result provided by the pilot acquisition module 106 is a list of sources, along with their timing offset, Doppler offset, and complex amplitude.

Preferably, the active user detection module 110 uses a complex baseband input signal of at least 4 samples per chip. If the input to the system is less than 4 samples per chip, interpolation is performed. Additionally, the list of sources and their respective parameters derived by the pilot acquisition module 106 are used. Furthermore, there may be a list of known or required users. In IS95, such a list would normally include paging and synch channels and the receiver user's own channel. The active user detection module 110 attempts to identify which of the available sub channels (A CDMA base station has 64 sub-channels, including pilot, paging, synch, and traffic channels) have users on it by comparing the power seen in that channel to a threshold. The output of the active user detection module 110 is a list of users for each source, along with their corresponding channel index and amplitude.

The CTCE module 108 takes in the complex baseband input signal sampled at one sample per chip and correlates it with a pilot signal at $-\frac{1}{2}$, 0 and $\frac{1}{2}$ chip delays. The correlation with the pilot at 0 delay is used to estimate the channel's complex amplitude, while the correlations at delays of $-\frac{1}{2}$ and $\frac{1}{2}$ are used to track changes in the timing offset. The output of the CTCE module 108 is a list of sources, their updated timing offset, Doppler offset, and complex channel amplitude.

The pilot cancellation module 114 takes the complex baseband signal sampled at 1 sample per chip as its data input and the list of sources and their timing offsets, Doppler offsets and complex channel amplitudes. It then uses the source information to synthesize a replica of the pilot for each source which it then subtracts from the complex baseband input. The output of the pilot cancellation module 114 is a pilot-less complex baseband signal which is fed into the MUD module 116. The MUD module 116 also uses the list of sources and their corresponding timing offsets, Doppler offsets and complex channel amplitudes, and the list of users and their corresponding Walsh code index, and amplitude.

The MUD module 116, in conjunction with remaining components performs interference cancellation by receiving and processing a discretely sampled waveform, performing estimation at a sub-symbol level, preferably down to the chip level, and incorporating parallel interference cancellation. Non-linear estimation and multistage architecture may also be provided, as described further below. Preferably, the MUD module 116 applies the previously described MG-MUD functionality. A more detailed embodiment of the MUD module 116 including components for carrying out such functionality is described further below.

The output of the MUD module 116 is a stream of soft decision symbols that are fed to the back end for error correction decoding and subsequently either the output data stream or into a vocoder to produce audio output.

The SCCR 100 internals may be provided as software, hardware, firmware, or any possible combination of hardware, firmware and/or software. The SCCR 100 may also be variously implemented such as on an Application-Specific Integrated Circuit or on a Digital Signal Processor, which include elements for executing the software or the like. The preferred implementation solution will depend on ease of integration with the overall system design.

Figure 2:
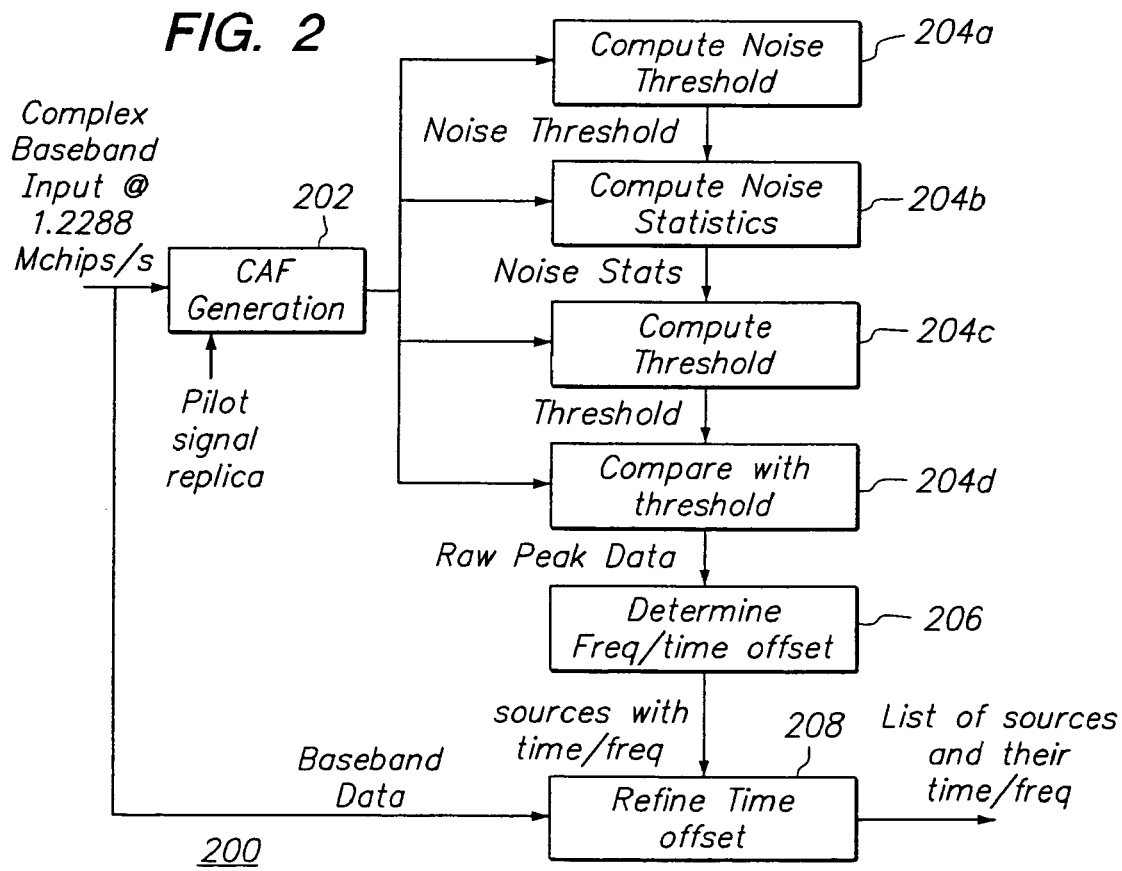
FIG. 2 is a schematic diagram illustrating an embodiment of a parallel pilot channel acquisition system.

FIG. 2 is a schematic diagram illustrating an embodiment of pilot acquisition 200 and corresponding modular architecture in accordance with the present invention. The figure describes an embodiment in which significant Doppler occurs and is compensated for. Depending on mobile speeds and frequency band, smaller Doppler effects might instead be compensated for by code tracking alone. The input to the system 200 is a fixed-length sequence of complex baseband samples, sampled at the chip rate. There is a tradeoff in the number of input samples used in the pilot acquisition. Increasing the samples improves the signal-to-noise ratio (SNR) of the channel estimates for each source, but it also increases the Doppler resolution, which means that far more computation must be performed to correctly estimate the Doppler offset. In the exemplar system, 8192 input samples are used in the pilot acquisition. The first component in pilot acquisition 200 is generation 202 of the complex ambiguity function. Let $M_{da}$ be the length of the input data sequence used for Pilot Acquisition, and let N be the number of positions in the code (32768) in the case of IS95. The CAF is the correlation between the input sequence and a periodic replication of the pilot signal that is provided for CAF generation 202 ("pilot signal replica"). The correlation is computed between the input sequence and the complex conjugate of the pilot signal with the appropriate code and Doppler offset.

For each Doppler offset, the correlation at N positions is calculated. For each point in the CAF, the magnitude squared is computed 202. A removal-of-outliers approach is used with a noise threshold 204a to generate noise statistics 204b. From this, a threshold is computed 204c and the CAF magnitude squared is compared to this threshold 204d. Positions whose corresponding magnitude squared exceeds a threshold are identified and added to a list of "mountains" 204d. Points on this list of mountains are clustered to identify CAF points corresponding to the same source. Maintained along with each mountain are the timing offset, the Doppler offset, and complex amplitude of each point 206. Additionally the same information is also maintained for the two adjacent Doppler bins for each point.

Timing offsets are then refined with a successive approximation procedure 208. For each cluster, the point with the largest magnitude squared is selected, and the point corresponding to one of the two adjacent Doppler bins with the larger magnitude of the two is also selected. The Doppler offset is computed by interpolating the Doppler offsets of the two points. The interpolation assumes that the CAF surface will have a sin x/x shape about the peak. Once the Doppler interpolation is completed, a pilot signal is synthesized and correlated with the same timing offset at the interpolated Doppler peak. The input signal is then correlated with the synthesized pilot and the complex amplitude is computed. The correlations are also computed with a timing offset of $-\frac{1}{2}$ and $\frac{1}{2}$ chip from this point. A successive approximation procedure is used to refine the Doppler offset estimate to the required resolution. In the exemplar, this resolution is $\frac{1}{16}$th of a chip. For each of the iterations, in successive approximation, three points (two intervals) are necessary. Starting with the two intervals already identified $[-\frac{1}{2}, 0]$, and $[0, \frac{1}{2}]$, the interval whose magnitudes sum to a larger value is selected, and, for example the point at offset $\frac{1}{4}$ chip is computed. The iteration continues until we have a point at resolution $\frac{1}{16}$th of a chip.

Figure 3:
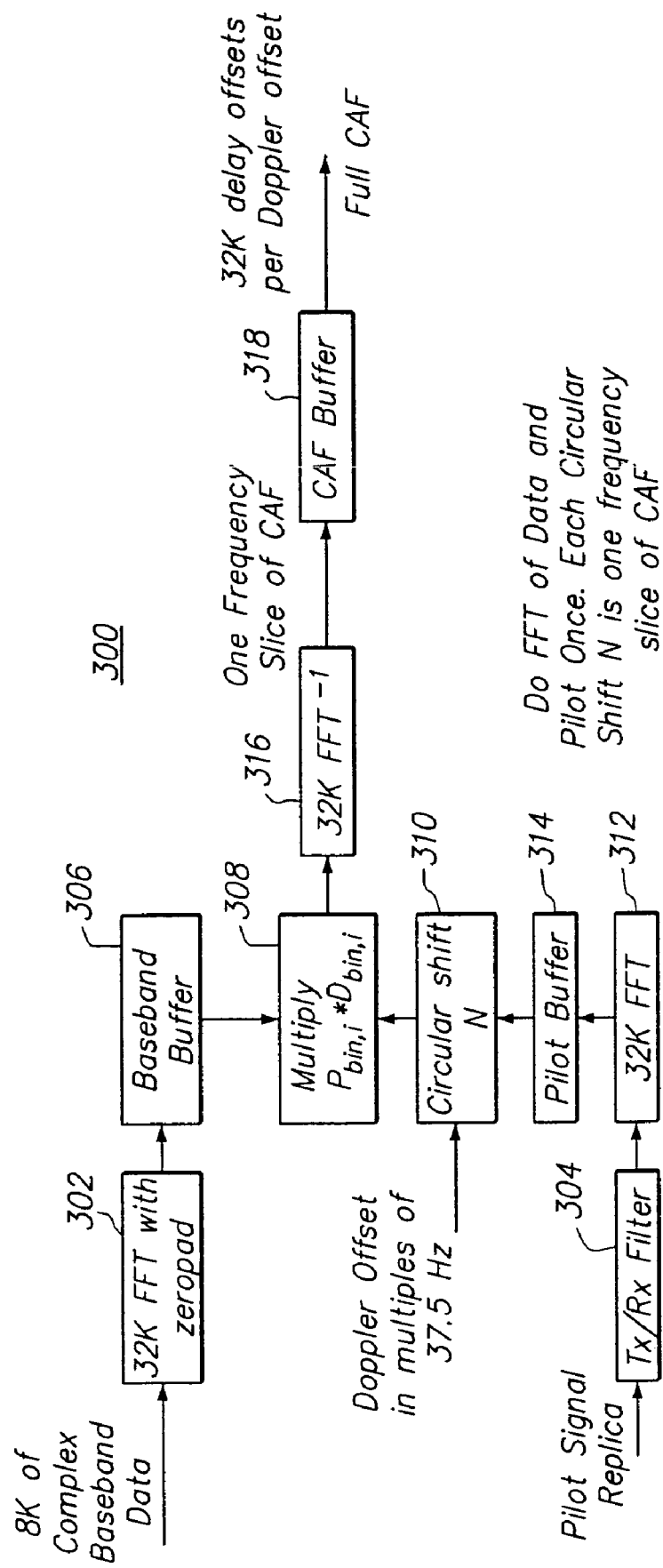
FIG. 3 is a schematic diagram illustrating an embodiment of complex ambiguity function generation usable with the parallel pilot acquisition system of FIG. 2.

FIG. 3 is a schematic diagram illustrating an embodiment of computing 300 the CAF using the fast Fourier transform (FFT). In particular for a given Doppler offset, the set of needed correlations can be obtained by performing a circular convolution of the input sequence with the pilot sequence. One relatively fast method of performing circular convolution is to take the discrete Fourier transform 302, 312 of both signals, point-wise multiply 308 the results together, and compute 316 the inverse discrete Fourier transform. The FFT is a fast algorithm for computing the DFT. The pilot signal replica may also be filtered 304 prior to application of the discrete Fourier transform 312. The resultant pilot signature waveform can be stored in the pilot buffer 314. In the case of IS95 since the pilot signal is 32768 samples long, the input signal is zero-padded 302 to form fill a buffer of size 32768. Then the FFT of the input buffer is computed. For the case of zero Doppler offset, FFT of the input buffer is point-wise multiplied 308 with the pre-stored pilot FFT. The result is passed through an inverse FFT 316 to produce the CAF values for all integer timing offsets at zero Doppler and retained 318 in the CAF buffer. For other Doppler shifts, the pilot signal is circularly shifted 310. Each circular shift N is one frequency slice of the CAF, with the collective slices comprising the full CAF. The threshold is chosen to achieve a tradeoff between detecting a remote pilot and producing false alarms.

Figure 4:
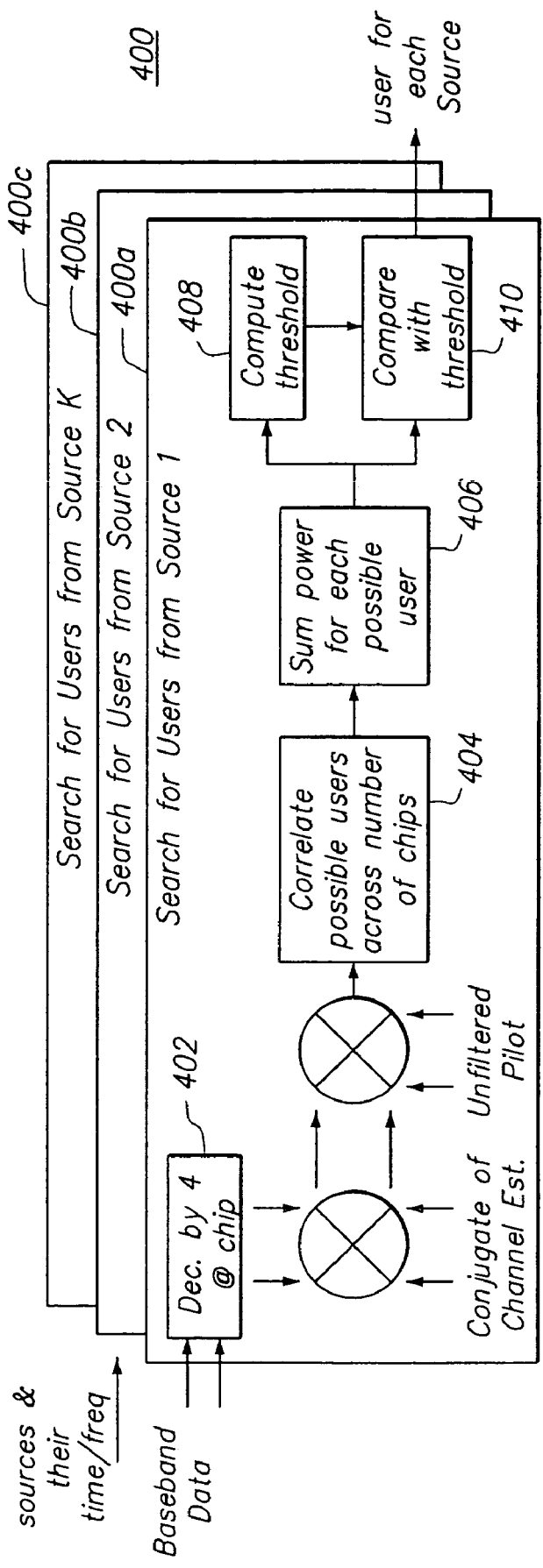
FIG. 4 is a schematic diagram illustrating an embodiment of a active user detection module usable in the CDMA communications receiver of FIG. 1.

FIG. 4 is a schematic diagram illustrating an embodiment of a user detection module 400 including multiple user detection sub-modules 400a-c. The input to the user detection module 400 is a complex baseband signal having sampling rate of at least 4 times the chip rate. In the exemplar, a sampling rate of 4 times the chip rate is used. Also input to the user detection module 400 is the list of sources, their timing offsets, Doppler offsets, and complex amplitudes. The search for users operates independently on each source. For each source, the phase of the input that is most closely aligned with the chip center is chosen, and the input is decimated 402 by a factor of four. The resulting signal is thus closely aligned with the pilot sequence. The decimated signal is then complex multiplied by the complex conjugate of the complex channel amplitude and then real and imaginary parts are multiplied by their corresponding pilot sequences and the results are summed together. Then the number of possible users is correlated 404 across the relevant number of chips. Preferably, when sixty-four samples aligned with a symbol are complete, a Hadamard transform is calculated which performs a crude demodulation on all sixty-four Walsh channels. Following this stage, the power for each channel is accumulated 406 over a specified time interval, for example five-hundred symbol periods. A threshold is computed 408 based on noise statistics using a noise threshold to determine the noise samples. The noise threshold is chosen to balance the competing interests of increased interference cancellation, limited computational capacity, and the cost of false alarms at the expected design point. For each channel, if the power is determined 410 to exceed a threshold, the user is determined to be active and its amplitude is estimated as the ratio of its power to the pilot power.

Figure 5:
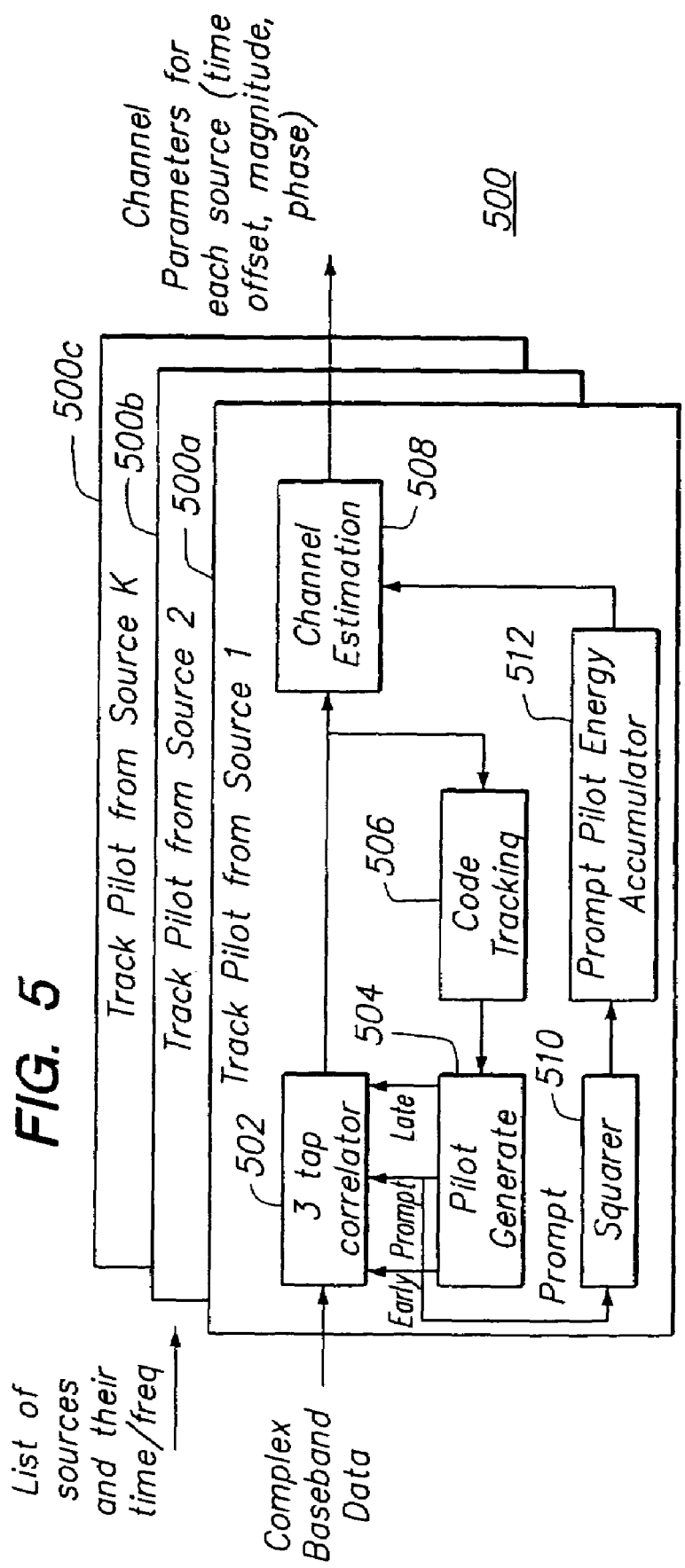
FIG. 5 is a schematic diagram illustrating an embodiment of a propagation channel estimate and code tracking module usable in the CDMA communications receiver of FIG. 1.

FIG. 5 is a schematic diagram illustrating code tracking and channel estimation 500 performed by the CTCE module and corresponding modular architecture. Again, the input is the complex baseband input signal sampled at one sample per chip, along with the list of sources, their timing offsets, Doppler offsets and complex channel amplitudes. Each of several parallel CTCE blocks 500a-c contains correlation 502, pilot generation 504, code tracking 506, channel estimation 508, squaring 510, and prompt pilot energy accumulation 512 modules. Pilot generation 504 is provided by the signature synthesis module 100 in FIG. 11, as discussed below. Preferably correlation is performed by a three-tap correlator, a variation of the standard early-late gate delay-locked loop (DLL). In most DLL's, a fixed pilot is correlated with the input signal being delayed and advanced by a $\frac{1}{2}$ chip. However, in one embodiment of the present invention, so that the input signal need only be available one sample per chip, a pilot signal delayed by $\frac{1}{2}$ chip is computed. This describes the implementation of an early-late gate DLL implemented in the code tracking module 506. Channel estimation 508 (amplitude and phase) follows from a correlation of the prompt pilot and data in the code tracking loop. The prompt pilot is also squared in element 510 and accumulated in 512 to calculate the prompt pilot energy for use in the channel estimation element 508.

Figure 6:
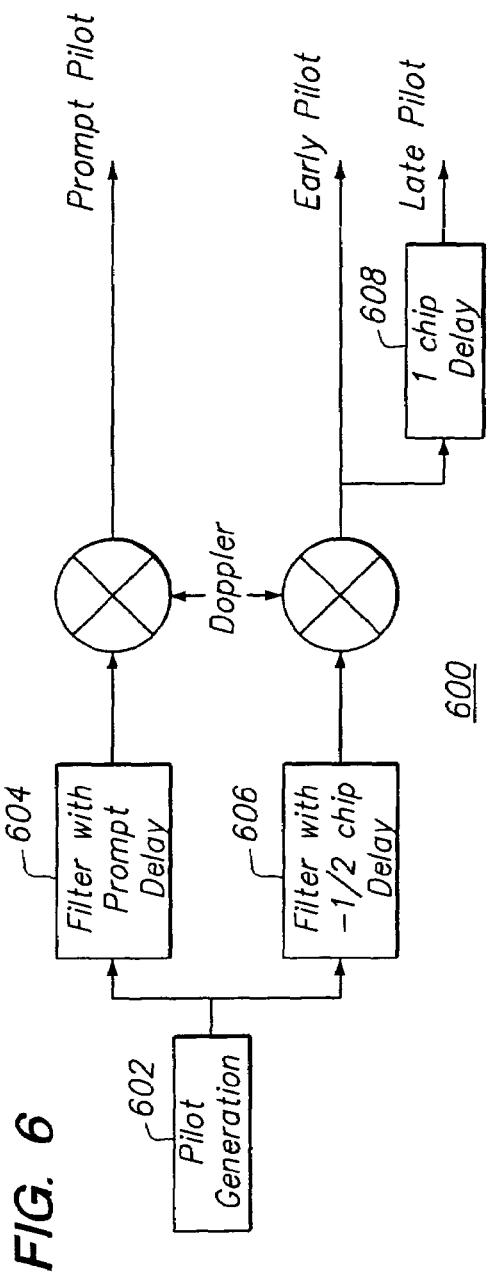
FIG. 6 is a schematic diagram illustrating an embodiment of pilot generation usable with channel estimate and code tracking of FIG. 5.

FIG. 6 is a schematic diagram illustrating pilot generation 600 performed by the CTCE module and corresponding modular architecture. The pilot is generated 602 and filtered 604 with no delay to produce the prompt pilot, and filtered 606 with a $-\frac{1}{2}$ chip delay to produce the early pilot. The early pilot is then delayed 608 by 1 chip to obtain the pilot with $+\frac{1}{2}$ chip delay, referred to as the late pilot. Each of these pilots is correlated with a complex input signal.

After a designated period, in the exemplar every 512 chips, an error metric is calculated as follows: (1) each of the three correlations (early, late and prompt) is multiplied by its complex conjugate to calculate early energy, prompt energy and late energy; and (2) the error metric is calculated as (early energy−late energy)/prompt energy.

The update to the timing offset is given by some feedback coefficient typically 0.1-0.3, multiplied with the error metric. The estimate of the channel's complex amplitude is calculated by dividing the prompt correlation (before squaring) by the energy in the prompt pilot. Once the update to the timing offset and update to the channel's complex amplitude are calculated, the four accumulators (early, late, prompt, and pilot energy) are initialized to zero, and the processing continues.

Figure 7:
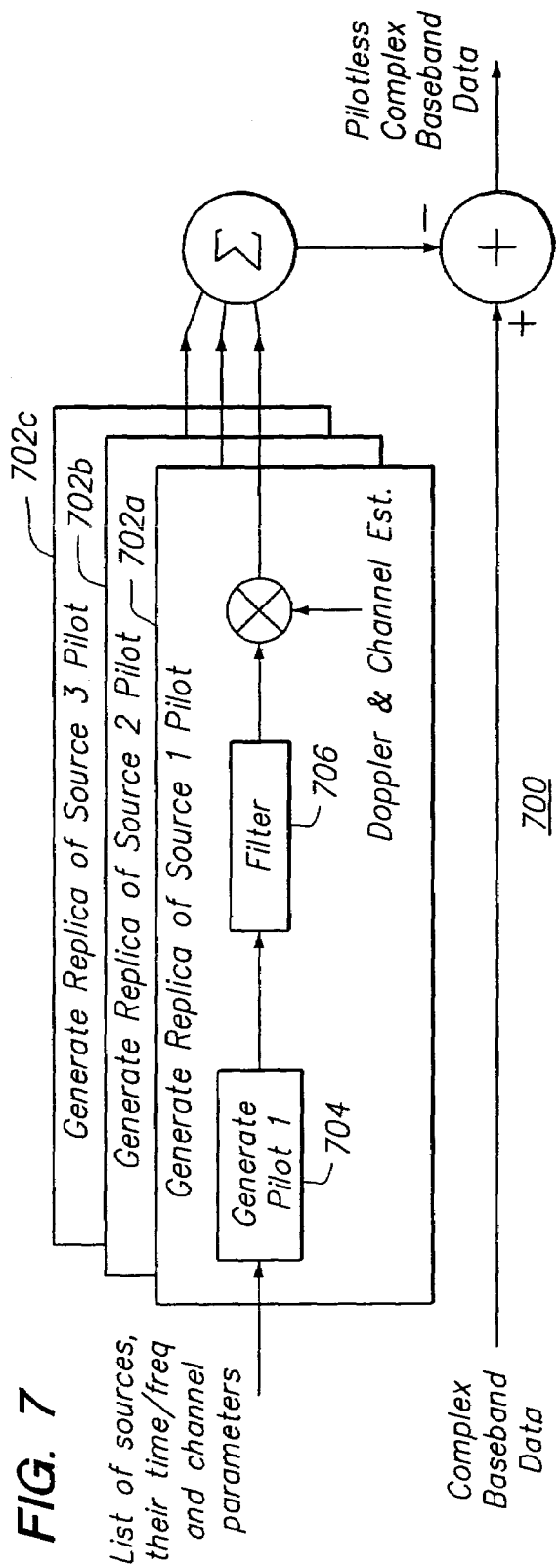
FIG. 7 is a schematic diagram illustrating an embodiment of a pilot cancellation module.

FIG. 7 is a schematic diagram illustrating pilot cancellation 700 performed by the pilot cancellation module. The input to pilot cancellation 700 is the complex baseband input signal sampled at 1 sample per chip. Additionally the list of sources, their timing offsets, Doppler offsets and complex channel amplitudes are taken from the outputs of the CTCE module. These parameters are used to generate 702a-c the pilot signal for each source. This pilot is then multiplied by the complex channel amplitude. The pilots are summed and then subtracted from the complex baseband data to provide pilot-less complex baseband data as shown. The output of the pilot cancellation module is fed into the data input of the MUD module.

Figure 8:
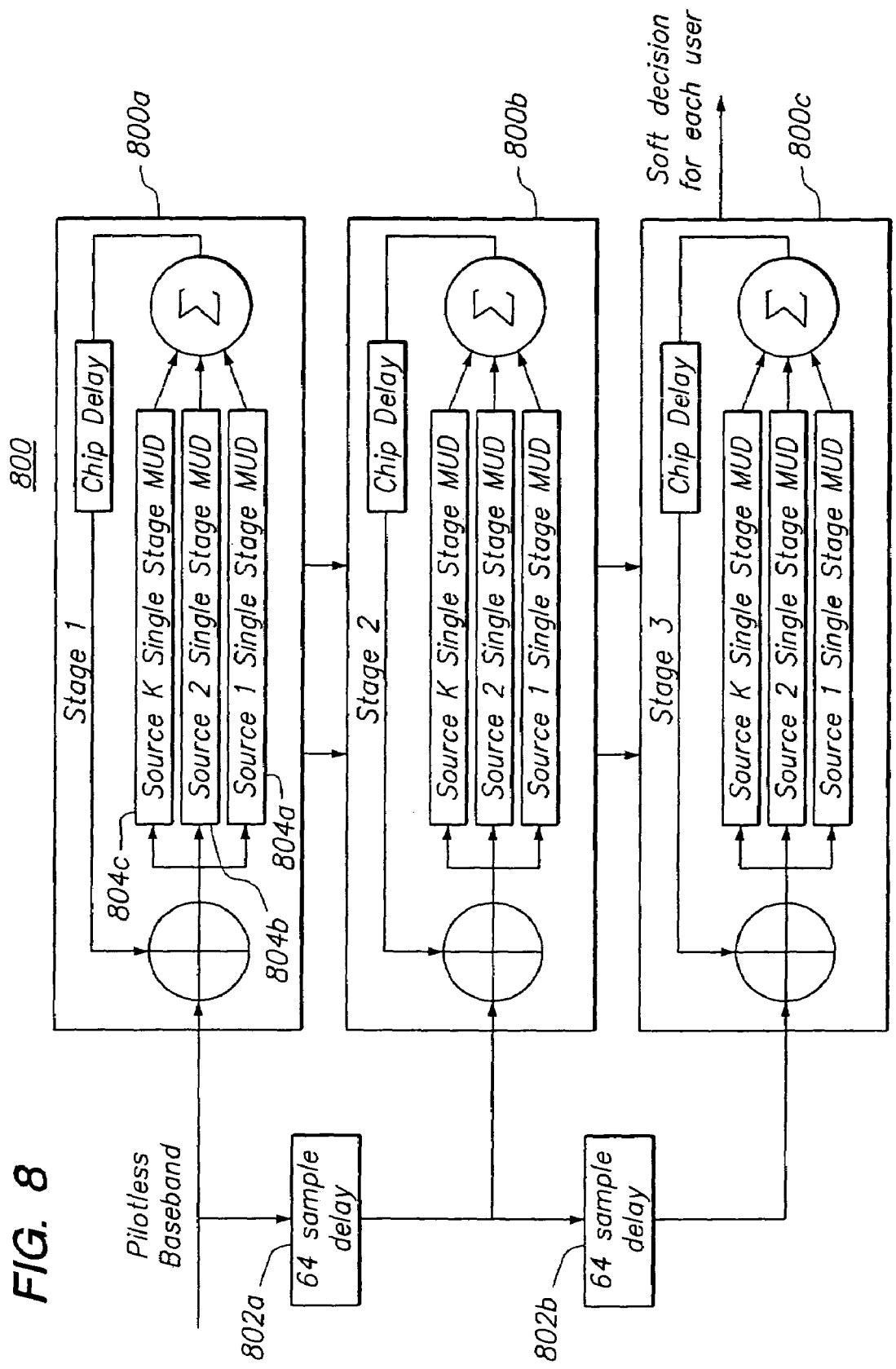
FIG. 8 is a schematic diagram illustrating an embodiment of multistage multi-user detection in accordance with the present invention.

FIG. 8 is a schematic diagram illustrating an embodiment of multistage muiti-user detection (MUD) 800, such as performed by the previously introduced MUD module in accordance with the present invention. Particularly, the described case involves K users using 64 chips per symbol, with three stages used in the detection. The multistage MUD 800 receives the pilot-less complex baseband input at 1 sample per chip and produces soft symbol estimate and bit estimate outputs.

Each MUD stage 800a-c is built around one or more MUD Processing Elements (MUDPE), preferably matching the number of users (K), sixty-four in the described example. For ease of depiction, three MUDPEs 804a-c are shown. A MUDPE contains two basic functions: a demodulator that decodes the input and estimates the current symbol, and a synthesizer, which based on the estimate of the symbol estimates the contribution of the current user to the next chip. For a given stage, the outputs of all MUDPE's 804a-c are summed together to form an estimate of the next chip of the pilot-less baseband input. The current chip's estimate for the stage (which would have been computed on the previous chip) is then subtracted from the pilot-less baseband input to form the innovation signal. This innovation is the component of the pilot-less baseband that cannot be predicted out. The innovation signal for a given stage is the input to all MUDPE's 804a-c for that stage 800a.

Each MUDPE 804a-c produces two additional outputs either to initialize the next stage for a given user, or as the final soft decision output for the user of interest. The first output is the soft decision output for that stage. For each user it is the linear accumulator of a matched filter operating on the pilot-less baseband input with the multi-access interference removed. Internal to the MUDPE, this pilot-less baseband input with the user's multi-access interference removed is formed as the summation of the innovation with the MUDPE's prediction of the user's contribution to the pilot-less baseband. For the first stage, this accumulator is initialized with zero. For later stages, this accumulator is initialized with the soft decision output of the previous stage.

The second output of the stage is the initial bit, (or in the case of non-BPSK modulation the initial constellation point) estimate for the next stage. This bit estimate is used for the initial bit estimate on the first chip of a given symbol processed by a stage. For the first stage, the bit estimate is zero. The actual bit is either −1 or +1. However, there are at least three approaches to producing a soft bit estimate internal. The first approach is to use a hard decision limiter, which is simply the sign of the soft decision accumulator. The second approach, which produces the optimal MMSE estimate is to compute the hyperbolic arctangent of the soft decision accumulator. The third and preferred approach approximates the hyperbolic arctangent function using a piecewise linear function whereby the output is equal to the input if the magnitude of the input is less than 1, but is clipped to either −1 or 1 if the magnitude is greater or equal to 1.

Both the soft decision output and the bit estimate outputs are latched during the processing for a given symbol. The latch is clocked at the end of the completed symbol. For IS95, a symbol is 64 chips. Therefore the input to a next stage is delayed 802a, 802b by the number of chips in a symbol since the output of the current stage won't be ready until it has processed all chips for a symbol. Similarly, a buffer of the size of the number of chips in a symbol is preferably be placed on the input between each successive stage.

Figure 9A:
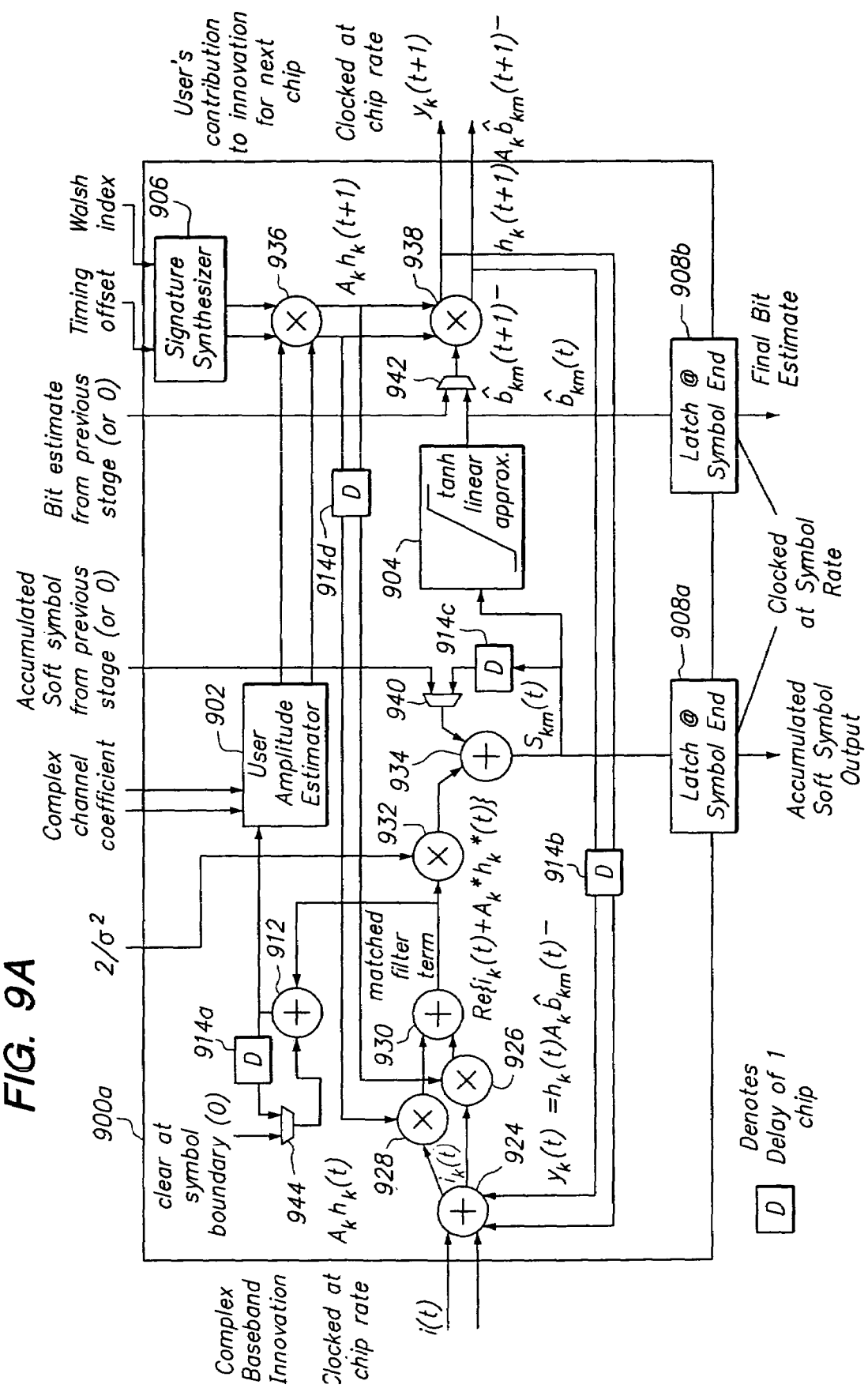
FIG. 9A is a schematic diagram illustrating an embodiment of a multi-user detection processing module in accordance with the present invention.
Figure 9B:
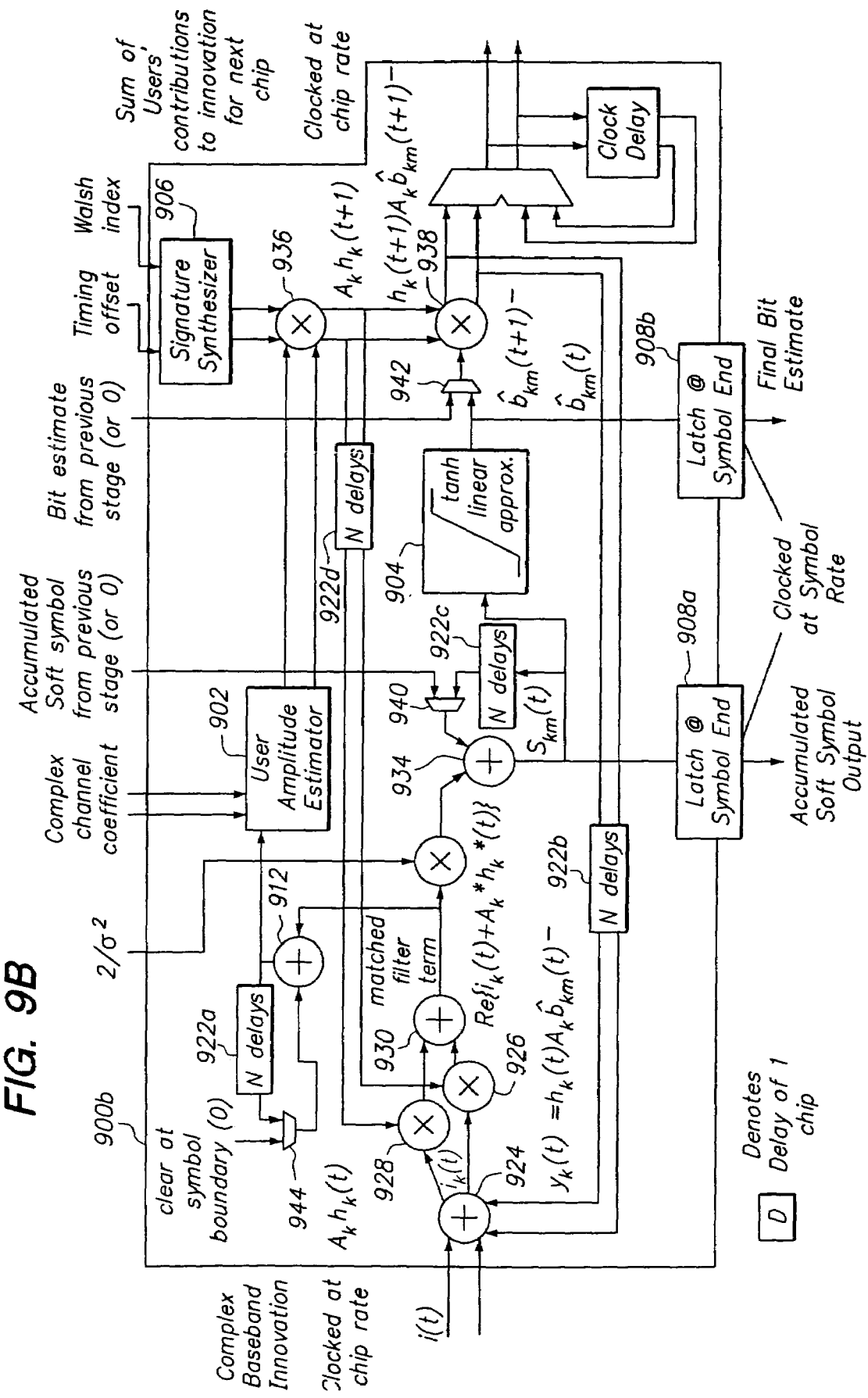
FIGS. 9B-9F are schematic diagrams illustrating other embodiments of a multi-user detection processing module.

FIGS. 9A and 9B are more detailed schematic diagrams of MUDPEs 900a, 900b. The input i(t) is the complex innovation. The complex variable $y_k(t)$ is the synthesis of the contribution to the pilot-less baseband for user k. As indicated in FIG. 9A, this contribution is $y_k(t)=h_k(t)A_k\hat{b}_{km}(t)^-$ for user k, stage m. The contribution $y_k(t)$ for user k and the innovation i(t) are summed together 924 to restore the contribution from user k. This forms the approximation $i_k(t)$ of the pilot-less baseband signal for user k with all multi-access interference removed according to the following equation:

$$i_k(t)=i(t)+h_k(t)A_k\hat{b}_{km}(t)^-$$

The MUDPE 900a includes a signature synthesizer 906 which receives the timing offset and the Walsh index for the user, and calculates the signature waveform. Calculation of the signature waveform is described further below with reference to FIG. 11.

The user estimator 902 calculates an estimate of $A_k$, the user's complex amplitude. The user's complex signature waveform $A_k h_k(t+1)$ is constructed from the multiplication 936 of the user's complex amplitude estimate and the signature waveform. This waveform is computed during the current chip to estimate the user's contribution to the next chip, The one-chip delay provided by delay 914d accommodates providing the appropriate value for the contribution to the current chip.

For the receiver (which can be viewed equivalently as a matched filter or as a correlator), $i_k(t)$ is multiplied by the complex conjugate of the signature waveform and then the real part of that product is taken to provide a matched filter term. This functionality comprises (1) multiplying 926 the real part of $i_k(t)$ with the real part of the signature waveform, (2) multiplying 928 the imaginary part of $i_k(t)$ with the imaginary part of the signature waveform, and (3) adding 930 the two products together, yielding the real component thereof. This value is provided to accumulator 912. In conjunction with feedback passed through delay element 914a, which passes the prior chip accumulated value to the accumulator 912, which effectively accumulates the value for input to the user amplitude estimator 902, which is used in user amplitude estimation as described further with reference to FIG. 10(10 or 11?) below. At every symbol boundary, the accumulator is cleared by multiplexing 944 in a zero.

In order to normalize the accumulator 934, the matched filter output value is scaled by 2 times the reciprocal of an estimate of the innovation variance $(2/\sigma^2)$, through multiplier 932. A running estimate of the innovation variance can be calculated outside the MUDPE 900a by computing the following running sum: 0.01×the current innovation squared plus 0.99 times the previous value in the accumulator 934.

The normalized matched filter output value for the current chip is provided to the accumulator 934 for the soft symbol output $S_{km}(t)$. The accumulator 934 also receives the previous accumulated value through delay 914c, which thereby retains an accumulated value for the soft symbol, incremented on a chip-by-chip basis. The soft symbol output $S_{km}(t)$ is provided to latch 908a, which is clocked at the symbol end to store the accumulated output $S_{km}(F_k(t)+L-1)$ for the user k for a full symbol period.

The soft symbol output $S_{km}(t)$ is also passed through a bit estimate computing module 904. In one embodiment, the bit estimate computing module 904 implements a non-linear computation, more particularly a piecewise linear approximation to the hyperbolic tangent function. In alternative embodiments, other non-linear computations, or a linear computation may be used for the bit estimation. The resultant bit estimate $\hat{b}_{km}(t)$ is output to latch 908b, which is clocked at the symbol end to provide the final bit estimate $\hat{b}_{km}(t+L-1)$. This latch 908b provides the soft bit estimate for this user k for this stage m at the end of the symbol period.

The multiplexer 942 controls the predicted a priori bit estimate $\hat{b}_{km}(t-1)^-$. If (t+1) represents the first chip in a symbol, the multiplexer selects the bit estimate from the previous stage or 0. Otherwise, $\hat{b}_{km}(t+1)^-=\hat{b}_{km}(t)$ The predicted bit estimate $\hat{b}_{km}(t+1)^-$ is also multiplied 938 by the previously described signature waveform $A_k h_k(t+1)$. To allow cancellation at the next time step, this prediction is fed forward to the accumulation of the innovation signal for the next time step. The result is the prediction of the user's contribution to the signal for the next chip. This quantity is both fed back through a chip delay 914b to be summed with the next innovation signal for the next chip (as $h_k(t)A_k \hat{b}_{km}(t)^-$), and also output from the MUDPE 900a to be added to the predictions of all of the other users.

The MUDPE 900a also operates in conjunction with the previously introduced multistage processing. To accommodate this, at the beginning of a symbol, accumulator 934 takes its input from the accumulated soft symbol from the previous stage and is selected by multiplexer 940. If there is no previous stage, then a zero is input as the accumulated soft symbol value.

The MUDPE 900a functionality may be embodied within a receiver. It may be provided as software, or also as hardware, firmware, or any possible combination of hardware, firmware and/or software. The MUDPE 900a software may also be part of a computer system wherein its instructions are executed by a processor. It may also take the form of a storage medium that stores the software, such as an optical disc in CD or other formats, magnetic storage, flash memory, or others.

It is noted that although conceptually, there is one MUDPE 900a for each user for each stage, it is also possible to embody multiple logical MUDPEs as a single physical MUDPE 900b as indicated in FIG. 9B. This arrangement would be most useful in a hardware implementation. Generally, the MUDPE 900b is similar to MUDPE 900a and to that end the similarly numbered items operate as described above. However, in lieu of individual latches 908a,b, the requisite number N of latches 920a,b are used, and in lieu of chip delays 914a-d, "N chip" delays 922a-b are used. Additionally, the User Amplitude Estimator, and Signature Synthesizer blocks have to be modified to have memory so that they can multiplex their outputs for the N respective users. Functionally, the MUDPE 900b operates like the previously described MUDPE 900a, with over-clocking and the addition of buffers. There is also an accumulator and clock delay at the output to add the contributions of the different users together. While the innovation signal input and the accumulated user contributions at the output are still clocked at the chip rate, the MUDPE 900b internals are clocked at N times the chip rate. The soft symbol output and the bit estimate outputs must also be synchronized with the next stage using symbol rate clocking.

There are several different approaches to combining estimates from different stages together. FIGS. 9c-9f describe four alternatives.

Figure 9C:
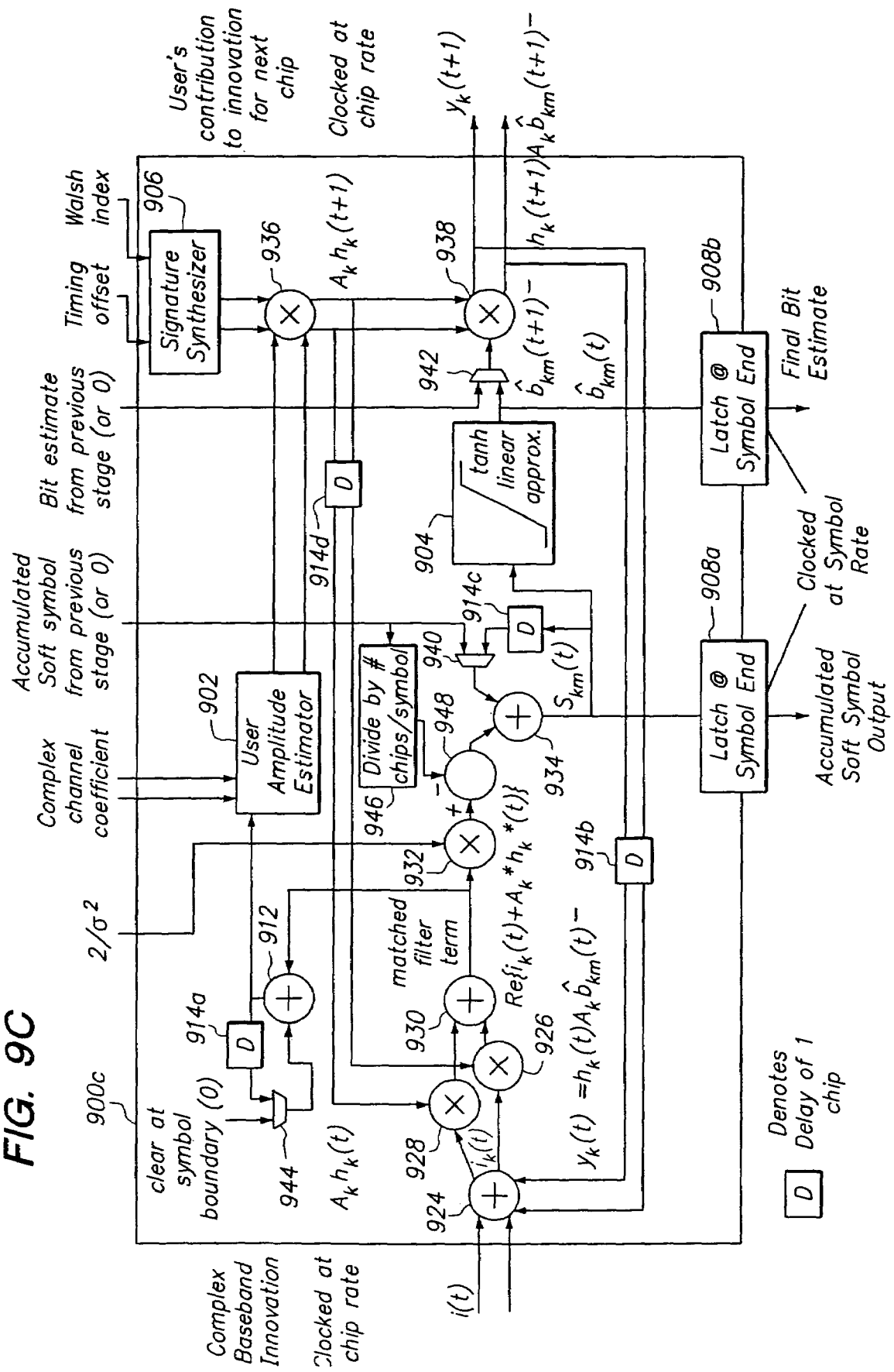

FIG. 9c is a variation on the MUDPE. In order for the accumulated soft decisions to have the interpretation as "log-likelihoods" the accumulation of matched filter output must be effectively carried out over 1 symbol period. This is achieved in FIG. 9c by dividing 946 the accumulated soft symbol in the previous stage by the number of chips in a symbol and subtracting 948 it from the current matched filter term using subtraction element. At the end of a symbol period, the entire accumulated soft symbol from the previous stage would have been subtracted so that the accumulation would be that of the matched filter term from the current stage.

Figure 9D:
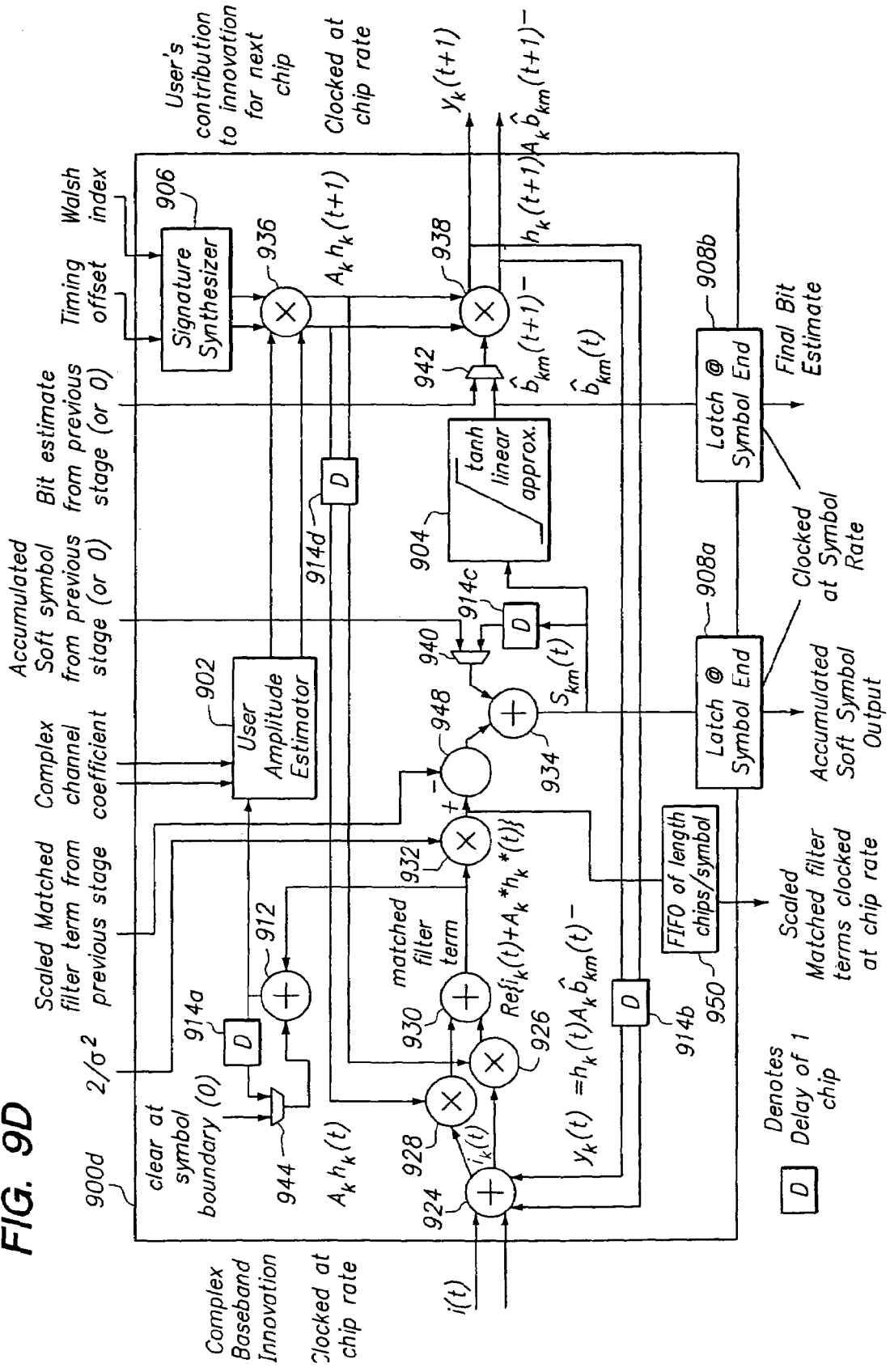

FIG. 9D is another variation on the MUDPE. In this variation, instead of subtracting out an average from the previous stage, the actual matched filter terms are passed between stages and subtracted out. More specifically, the matched filter term, scaled by the innovation variance ($2/\sigma^2$), for each chip is passed into a first-in-first-out (FIFO) buffer element 950 and is clocked out at the chip rate. A signal representing the scaled matched filter term from the previous stage is an input and is subtracted from the current scaled matched filter term using subtraction element 948. The net result is that at every chip, the accumulator contains an exact accumulation using the scaled matched filter term for each chip. For chips from the beginning of the symbol to the current symbol the accumulation has the newest value, and for chips after the current chip, the accumulation has the value used on the previous stage. The advantage of this technique is that does not need to approximate the value to be subtracted off by its mean value. The disadvantage is that it requires and additional FIFO buffer.

Figure 9E:
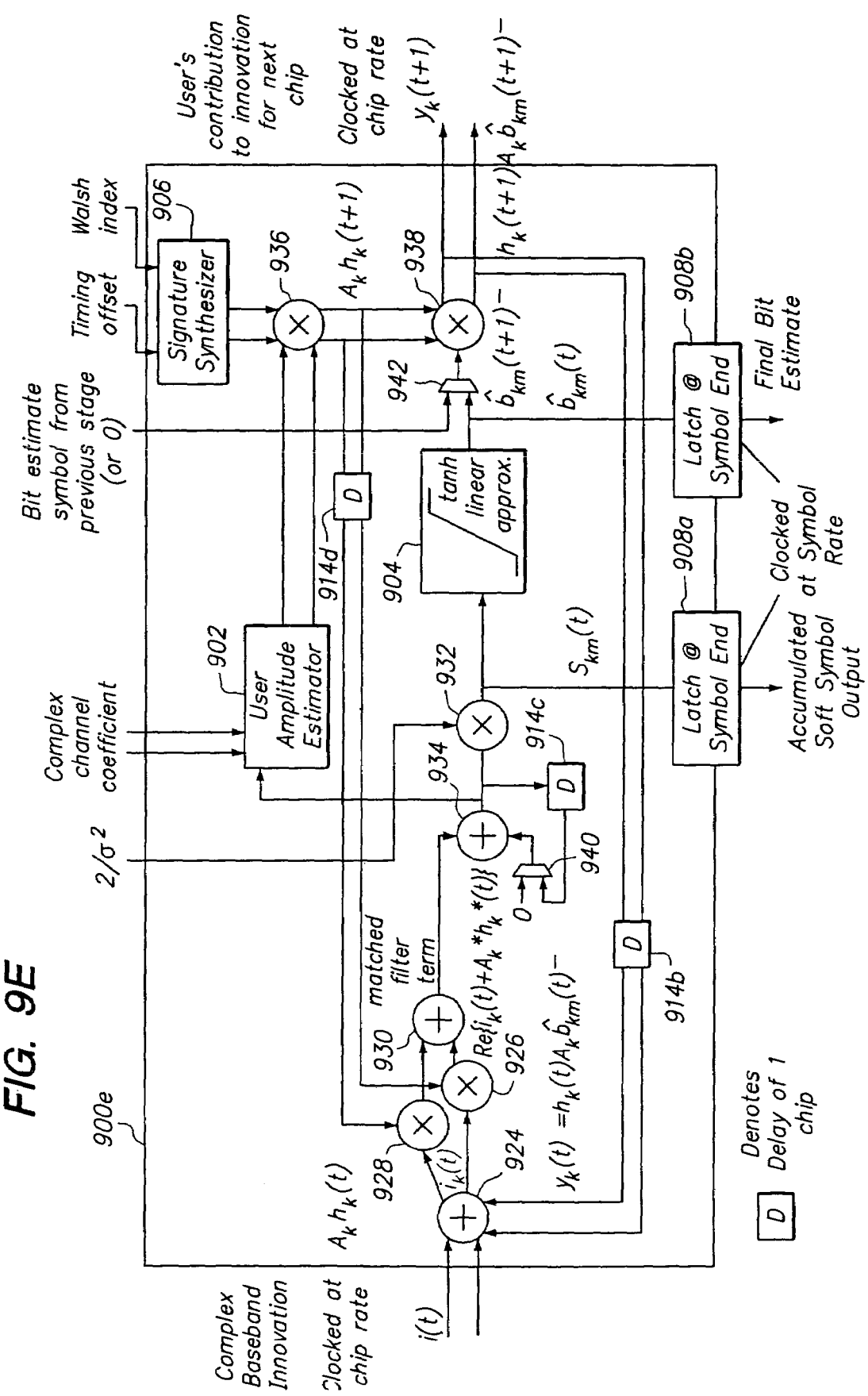

FIG. 9E is another variation of the MUDPE that could be used for the first stage of MG-MUD. This variation involves merging of the functions of accumulator (912, FIG. 9A) into accumulator 934, and the placement of the multiplication element 932 at the output of the accumulator 934 rather then the input. If this variation had been used on the first stage, then both accumulators 912 and 934 would have been initialized with 0 anyway. Similarly, on the first chip, the multiplexing element 942 would choose the bit estimate as 0 and on the next N–1 chips, where N is the number of chips per symbol, choose the bit estimate from the output of the nonlinearity.

Figure 9F:
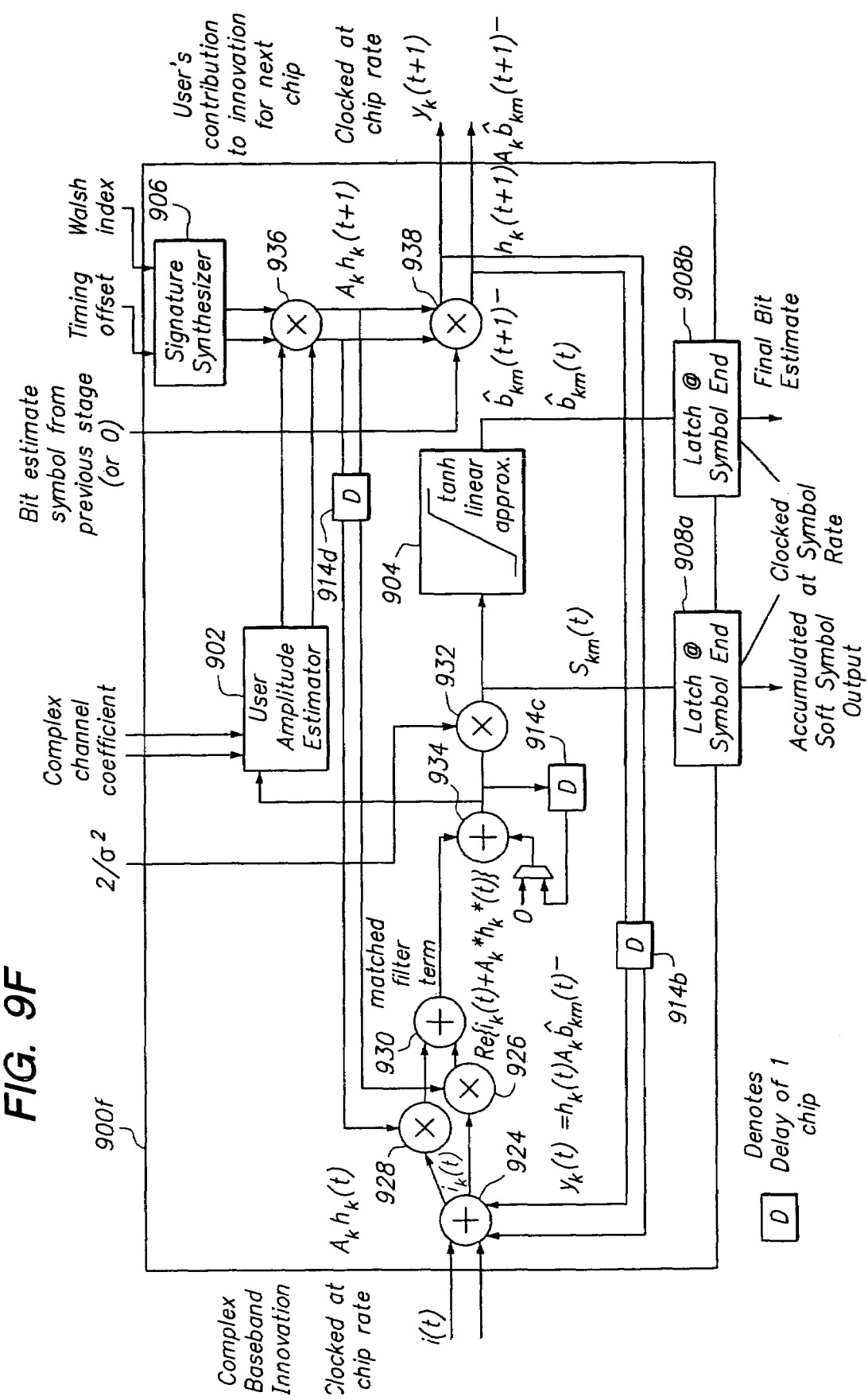

FIG. 9F is a variation that is similar to FIG. 9E. It is used to implement a PIC algorithm using this architecture. The primary difference is that elimination of multiplexing element (942, FIG. 9E) altogether. The current bit estimate $\hat{b}_{km}(t)$, the output of the non-linearity 904 is latched at the symbol end. The estimation used in the prediction, $\hat{b}_{km}(t+1)^-$, is taken as the estimate from the previous stage.

According to still another aspect of the present invention, a reconfigurable architecture implements various MUD methods through the selection of an update gain factor and a non-linear function. This architecture (referred to as the Recursive Multi-Stage MUD (RMSM) algorithm architecture) is a multi-stage, sample-level implementation of the basic functions common to various MUD methods. The common functions include multi-stage state prediction and update equations and diagonal gain matrix update equations. The RMSM architecture is configured to a specific MUD method by calculating and applying the time and stage-dependent gain factor that corresponds to that method. The configuration also requires the selection of a method-specific non-linear function used for symbol estimation and decision, and the selection of a method-specific state update equation. MUD algorithms supported by the RMSM architecture include the Mixed Gaussian Demodulator, PIC, Partial PIC, Decoupled Kalman Demodulator, and hybrid multi-stage MUD methods.

Figure 9G:
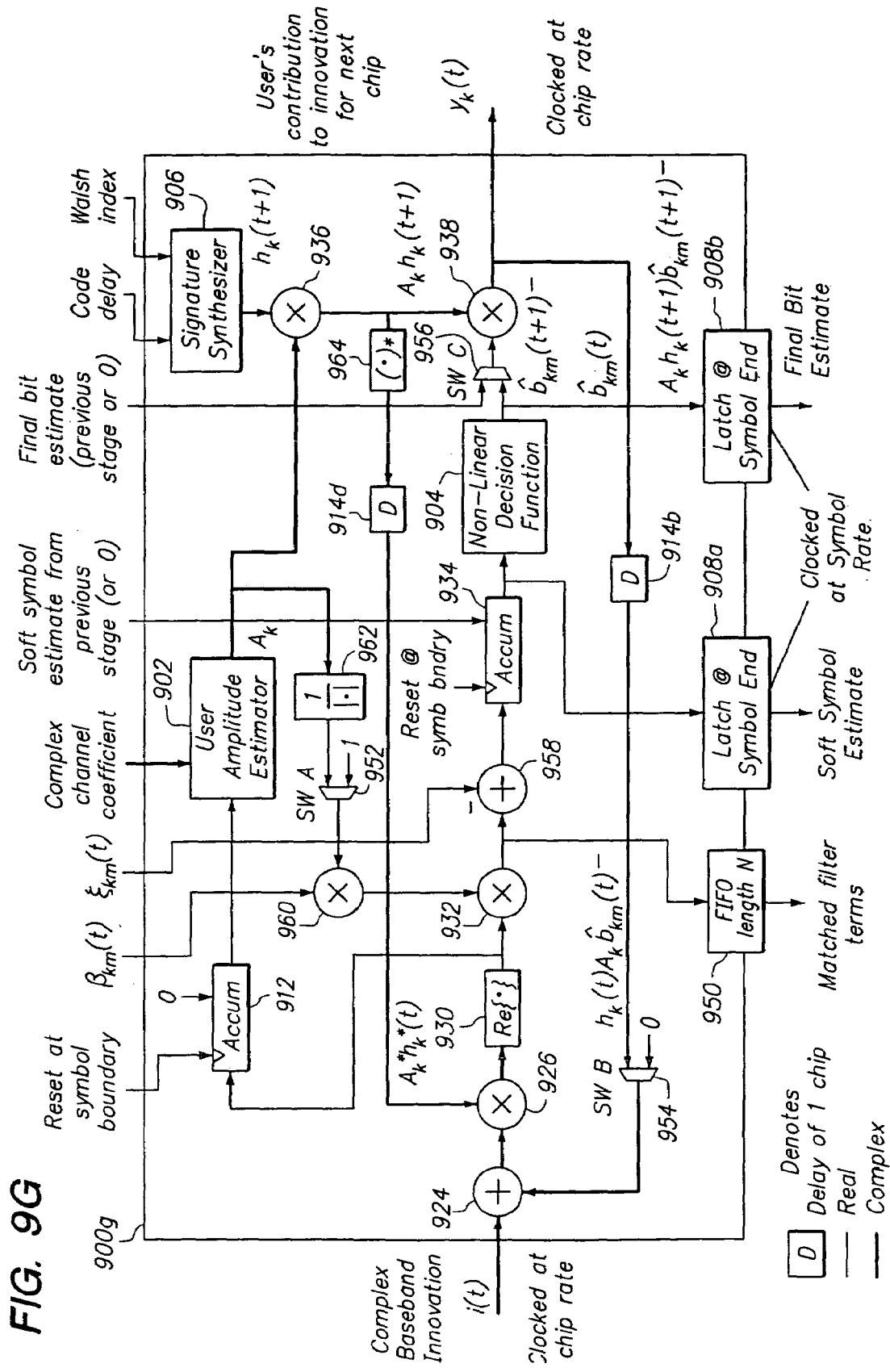
FIG. 9G is a schematic diagram illustrating another embodiment of a multi-user detection processing module, with recursive multi-stage functionality.

FIG. 9G illustrates an embodiment of the MUD processing element 900g embodying the RMSM architecture. This processing element 900g implements the functionality of the processing elements depicted in FIGS. 9A-9E in a single architecture. The processing element 900g contains additional switches 952, 954, 956, accommodates the introduction of different sets of gain factors $\beta_{km}(t)$ and subtraction 956 of likelihood related terms $\xi_{km}(t)$.

FIG. 9G has been variously simplified but is otherwise consistent with FIGS. 9A-F. First, it illustrates the non-linear decision function 904 generally. As with other embodiments, various non-linear decisions functions may be applied, including but not limited to the tan h function depicted in some of the figures. Additionally, the complex number pathways are shown in a single bold line in lieu of two lines. Accordingly, the function of multiplier 928 is merged into multiplier 926. Complex multiplier 926 multiplies the incoming signal by the conjugate of the synthesized signature waveform. Function 964 performs the conjugation operation. Since this design embodies an architecture able to implement various other algorithms, the reciprocal of the magnitude scaling function 962, switch 952, and multiplier are provided so different gain factors b(t) can be used and so the user amplitude can be calibrated out. Further, the functionality provided by respective multiplexers and delays is not shown but is understood to be merged into the illustrated accumulators 912, 934.

By selecting the right set of gain factors, setting various switches, and selecting the desired non-linear decision function, this processing element 900g can easily be reconfigured to perform a single stage of any of various MUD algorithms, such as PIC, PPIC, DKD, MGMUD, or various hybrid multi-stage methods.

Often, the method-specific set of gain factors can be pre-computed and stored in a table. In its most general form, the size of each table is a [N×M×K] table where N is the number of chips/symbol, M is the number of stages, and K is the total number of users (or channels). The current user, the current processing stage, and the current chip within a symbol determine the indices into a table.

The gain-factor vectors $\beta_{km}(t)$ are a function of the current algorithm in effect and the stage number.

For PIC, the gain factors are independent of both the stage and user and are:

$$\beta(n_k) = \frac{1}{n_k} \text{where } n_k = \{1, \ldots, N\}$$

is the current chip index within the symbol and N is the number chips per symbol.

The gain factors for the Partial PIC algorithm is similar to PIC but include a stage dependent weighting:

$$\beta_m(n_k) = \frac{\lambda_m}{n_k} \text{ where } 0 \leq \lambda_m \leq 1.$$

Normally, the lm approaches 1.0 as the stage number increases.

As the name implies, the gain factor for the Block-structured Fixed-gain Kalman Demodulator (BFKD) is simply $$\beta_m(n_k) = \frac{\alpha_m}{N} \text{ where } \alpha_m$$

takes on a user defined value between 0 and 1. Refer to B. Flanagan and J. Dunyak, "Steady State Kalman Filter Technique for Multiuser Detection," Proceedings of the IEEE Milcom 2003 Conference, Oct. 13-16, 2003, for algorithm description and related references.

Gain factors for the Decoupled Kalman Demodulator ("DKD Gain Factors") can be defined according to J. Dunyak, "A Decoupled Kalman Filter Technique for Multiuser Detection of Pulse Amplitude Modulation CDMA," IEEE Proc. of Wireless and Optical Communications, 2002.

It is assumed that one of several non-linear decision functions can be selected depending on the desired algorithm desired. Candidate functions include the hard-limiter, the sign function, the clipping limiter, erasures, and the hyperbolic tangent. An Erasure is a 3-level function that assigns an output of −A, 0, +A depending on the input signal.

As stated previously, with but a change of a few parameters, the RMSM architecture can be adapted to a specific algorithm. Referring to FIG. 9x, the configuration for each specific algorithm are as follows:

For PIC:
1. Use the gain factors for PIC
2. Set switch A so the gain factor is scaled by the inverse of the absolute value of the user amplitude
3. Set switch B so the regenerated signal is added to the input complex baseband innovation i(t)
4. Trigger switch C so the non-linear symbol estimate from the previous stage is used every time.
5. Select desired non-linear detection function with an preceding 1/N scaling
6. Set the likelihood term $\xi_{km}(t)=0$, where N is the number of chips/symbol.

For PPIC:
1. Use the gain factors for Partial PIC
2. Set switch A so the gain factor is scaled by the inverse of the absolute value of the user amplitude
3. Set switch B so the regenerated signal is added to the input complex baseband innovation i(t)
4. Trigger switch C so the non-linear symbol estimate from the previous stage is used every time.
5. Select desired non-linear detection function with preceding 1/N scaling
6. Set the likelihood term $\xi_{km}(t)=0$ For MG-MUD:
1. Use the gain factors for MG-MUD
2. Set switch A so the gain factor is scaled by 1
3. Set switch B so the regenerated signal is added to the input complex baseband innovation i(t)
4. Trigger switch C so the current non-linear symbol estimate is used every time except at the beginning of a symbol boundary. In which case, non-linear symbol estimate from the previous stage is used.
5. Select the hyperbolic tangent or a clipping limiter
6. To implement FIG. 9a version of MG-MUD, set the likelihood term $\xi_{km}(t)=0$. To implement FIG. 9c version, set $\xi_{km}(t)$ (soft symbol estimate from previous stage)/N. To implement FIG. 9d version, set $\xi_{km}(t)$ equal to the corresponding matched filter term from the previous stage.

For DKD:
1. Use the above introduced DKD Gain Factors
2. Set switch A (952) to 1
3. Set switch B to 0
4. Trigger switch C so the current non-linear symbol estimate is used every time except at the beginning of a symbol boundary. In which case, non-linear symbol estimate from the previous stage is used.
5. Select <TBD> non-linear function
6. Set the likelihood term $\xi_{km}(t)=0$ For BFKD:
1. Use the gain factors for BFKD
2. Set switch A (952) to 1

Figure 10:
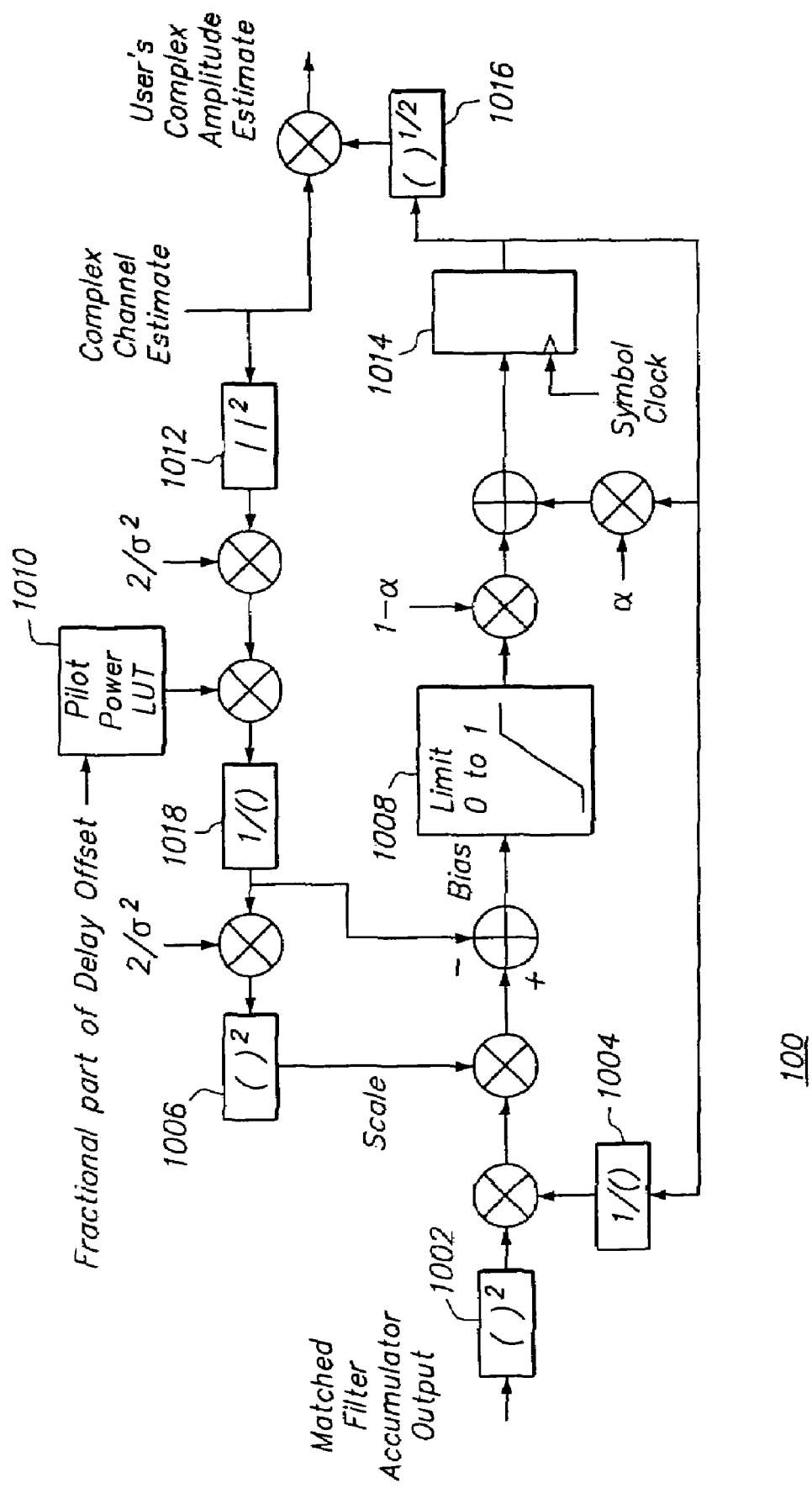
FIG. 10 is a schematic diagram illustrating an embodiment of a user amplitude estimator for a multi-user detection processing module.

3. Set switch B to 0
4. Trigger switch C so the current non-linear symbol estimate is used every time except at the beginning of a symbol boundary. In which case, non-linear symbol estimate from the previous stage is used.
5. Select <TBD> function
6. Set the likelihood term $\xi_{km}(t)=0$ FIG. 10 is a schematic diagram of an embodiment of a user amplitude estimator 1000 which can be used in the previously described MUDPEs 900a, 900b. As previously described, a second accumulation of the matched filter output is performed that is always initialized to zero at the start of a symbol, and not normalized. This is referred to as the matched filter accumulator input, which is received by the user amplitude estimator 1000. Additional inputs include the fractional part of the timing offset, the complex channel estimate, and 2 times the reciprocal of the innovation variance ($2/\sigma^2$) as shown. Regarding the fractional part of the timing offset, in the case of timing offset to 1/16th chip resolution, this number will be a 4-bit quantity 0-15 with all bits to the right of the binary point. This value will be used to lookup the pilot power for that phase. The pilot power look up table (LUT) 1010 pre-stores the pilot power corresponding to the phase to provide this information. The value of 2 times the reciprocal of the innovation variance is the value previously described as being supplied to the rest of the MUDPE. The complex channel estimate is obtained from the previously described CTCE module.

The user's relative amplitude is a positive number typically less than one which measures the ratio of the user's amplitude to that of the pilot. The user amplitude estimator 1000 will compute a point-estimate of the square of this quantity every symbol, and will then take a convex combination of the point estimate and the prior current estimate of the square of the user's relative amplitude. More specifically, for the parameter α, which in the figure is 0.99, the estimator 1000 takes 0.01 (1−α) times the point estimate plus 0.99 (α) times the prior estimate. The result is clocked at the symbol rate (1014) and the square root of the result (1016) is multiplied by the complex channel estimate to provide the user's complex amplitude estimate.

The point estimate is computed by taking the magnitude squared (1002) of the matched filter accumulator output at the end of a symbol and multiplying it by the reciprocal of the prior estimate (1004) of the user's relative amplitude squared. The result is than multiplied by a scale factor and a bias is removed. Finally the point estimate is limited to the range 0 to 1 (1008). The square root of the new estimate of the user's relative amplitude squared is taken and then multiplied by the complex channel amplitude estimate to obtain the complex amplitude estimate for that user. The scale and bias terms used in the calculation are computed as follows. The magnitude squared of the complex channel estimate (1012) is multiplied by twice the reciprocal of the innovation variance. It is also multiplied by the pilot power, as provided from the pilot power LUT 1010, which may be different depending on the 4-bits denoting the fractional part of the timing offset. The reciprocal is taken of the result (1018) as the bias. The quantity is then multiplied by twice the reciprocal of the innovation variance and the output squared (1006) to produce the scale.

Figure 11:
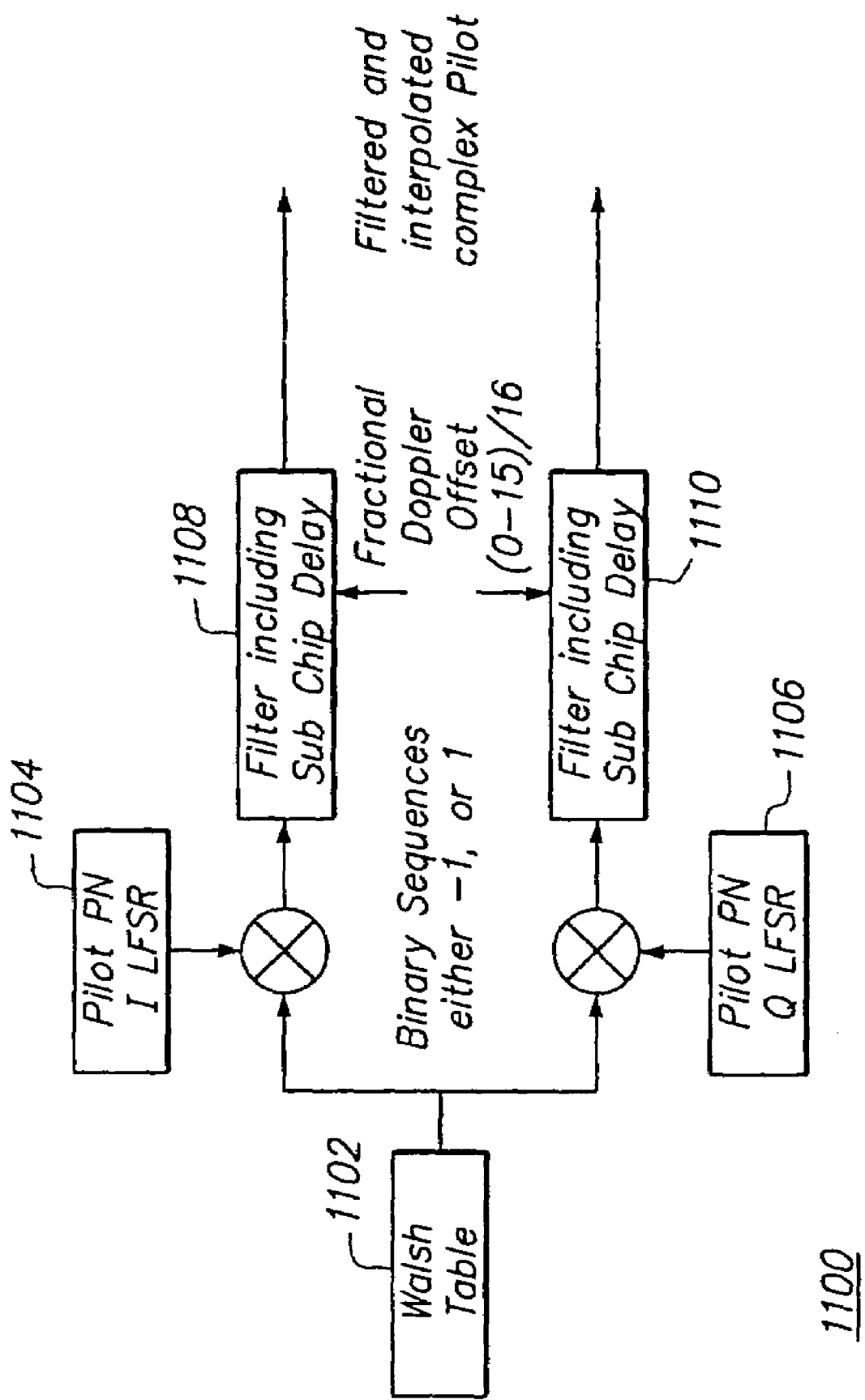
FIG. 11 is a schematic diagram illustrating an embodiment of a signature waveform synthesizer.

FIG. 11 is a schematic diagram illustrating an embodiment of a signature synthesizer 1100, which can be used by the previously introduced pilot acquisition, CTCE, and pilot cancellation modules and the MUDPE. The real and imaginary pilots are computed using linear feedback shift registers (LFSR) 1104, 1106 as would be specified in a standard such as IS-95. For each of the 64 Walsh channels, a different code is applied from the Walsh table 1102. The result is a binary sequence. A "0" bit is mapped to a symbol of 1, and a "1" bit is mapped to the symbol −1. To produce an interpolated version of the pilot at one of the 16 required fractional offset, the binary input must be filtered 1108, 1110. In the preferred embodiment, this filter is a 12-tap finite impulse response (FIR) filter. The result is either the pilot synthesized in the case of Walsh code 0 (which is all 1's) or the signature sequence for any other Walsh channel.

Figure 12:
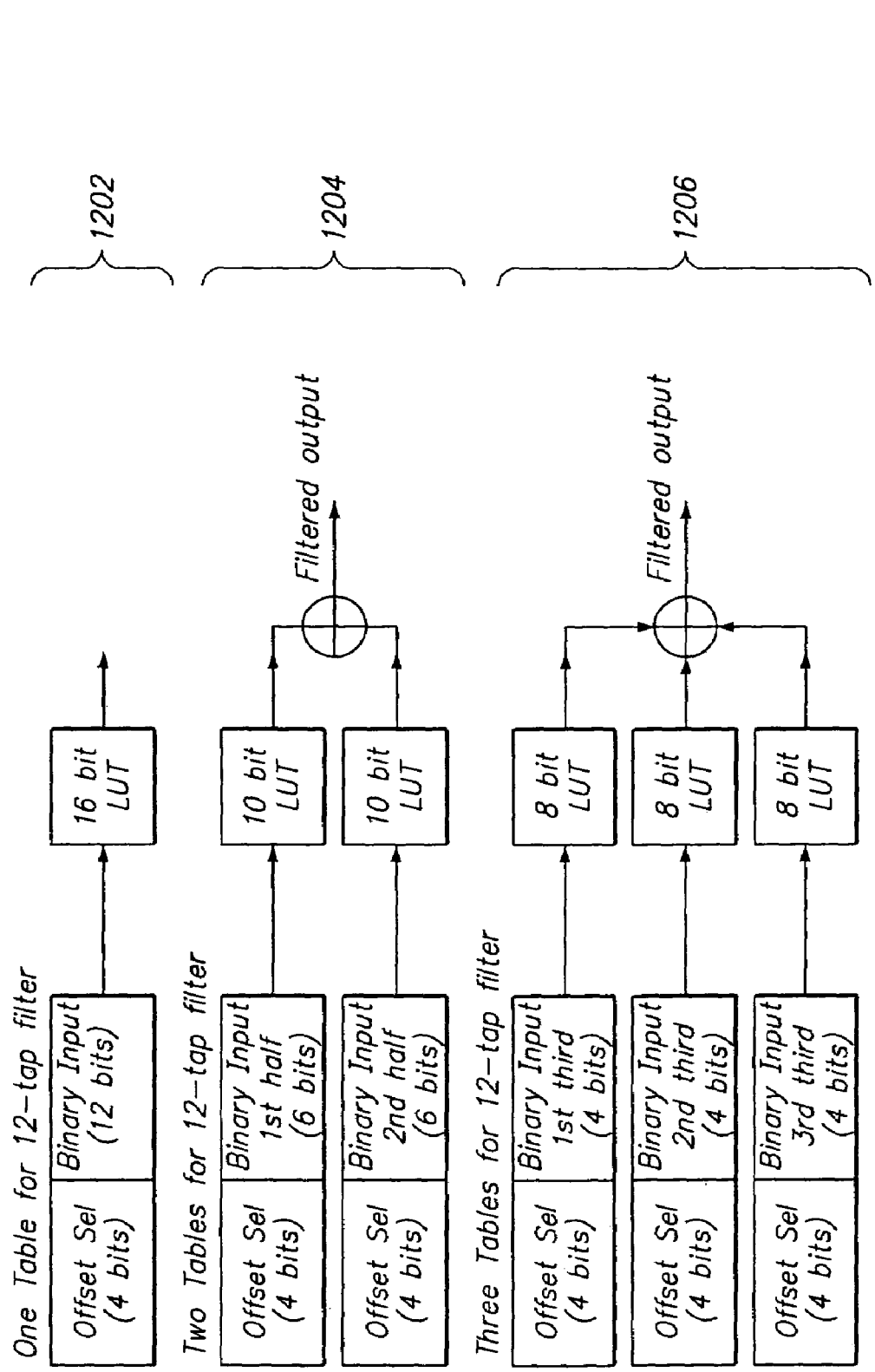
FIG. 12 is a schematic diagram illustrating an embodiment of a sub-chip interpolation filter used in the signature waveform synthesizer.

FIG. 12 is a schematic diagram illustrating sub-chip interpolation filters that can be used by the MUDPE signature synthesizer 1200, more particularly three different implementations 1202, 1204, 1206. Since the input is binary, the output can be calculated using a look up table. There are several tradeoffs to be made in the implementation depending on the cost of the lookup table vs. the cost of using adders. Preferably, since there are 16 possible fractional offsets, 4 bits must also be used to select the correct filter. The one table implementation 1202 requires 16-bits (12-bits for the data input plus 4 bits to select which fractional offset) or 65536 locations to produce the output, but uses no additional logic. The two-table implementation 1204 requires two 10-bit tables, or 2 times 1024=2048 locations. For the 10 bits, 4 bits select the fractional offset, and the other 6 bits are either the first half of the 12-bit sequence or the second half. The outputs of the two tables must be added together to realize the 12-tap FIR filter. In the three-table implementation 1206, three 8-bit tables are required, or 3×256=768 locations. For the 8 bits, 4 bits select the fractional offset and the other 4 bits are either the 1st, 2nd, or 3rd 4-bit segment of the 12-bit input sequence.

Thus embodiments of the present invention produce and provide improved interference cancellation in a CDMA communications environment. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for canceling multiple user interference in a communications system wherein a plurality of users communicate over a shared channel, the method comprising:
    receiving an input that provides a plurality of discrete values produced at sub-symbol intervals that are less than a full symbol period, wherein a current discrete value corresponds to a current sub-symbol interval for a current symbol and a previous discrete value corresponds to a previous sub-symbol interval for the current symbol; and
    estimating symbols for a given user from the plurality of users at sub-symbol intervals, wherein a current estimation for the given user estimates a portion of the current discrete value that corresponds to the current symbol for the given user and cancels interference produced by the plurality of users as determined from the previous discrete value during the previous sub-symbol interval.

2. The method of claim 1, wherein the communications system is a code division multiplex access communications system.

3. The method of claim 1, wherein the sub-symbol intervals are chip intervals.

4. The method of claim 1, wherein estimating symbols for the given user is performed by a plurality of processing stages.

5. The method of claim 1, wherein a plurality of processing elements respectively perform estimations for each of the plurality of users at sub-symbol intervals to accommodate canceling interference produced by the plurality of users.

6. The method of claim 4, wherein the plurality of processing stages includes a first stage and a second stage, the first stage providing an accumulated soft symbol output for the given user to the second stage, the second stage estimating symbols for the given user using the accumulated soft symbol output.

7. The method of claim 6, wherein the input as received by the second stage is delayed by a symbol period relative to that received by the first stage.

8. The method of claim 1, wherein symbol estimation is based upon one of a minimum mean squared error estimate.

9. The method of claim 8, wherein the minimum mean squared error estimate is a linear mean squared error estimate.

10. The method of claim 1, wherein symbol estimation is based upon a mixed Gaussian distribution.

11. The method of claim 4, wherein individual stages from the plurality of processing stages are of different types.

12. The method of claim 4, wherein each processing stage in the plurality of processing stages performs a multi user detection algorithm selected from the group consisting of mixed Gaussian (MG), decoupled Kalman (DK), parallel interference cancellation (PIC), and partial parallel interference cancellation (PPIC).

13. The method of claim 4, wherein each processing stage in the plurality of processing stages includes a recursive multistage demodulator.

14. The method of claim 13, wherein the recursive multistage demodulator includes gain factor and non-linear function modules that are reconfigurable to allow corresponding processing stages to perform a multi user detection algorithm selected from the group consisting of mixed Gaussian (MG), decoupled Kalman (DK), parallel interference cancellation (PIC), and partial parallel interference cancellation (PPIC).

15. An apparatus for canceling multiple user interference in a communications system wherein a plurality of users communicate over a shared channel, the method comprising:
    an input that receives a plurality of discrete values produced at sub-symbol intervals that are less than a full symbol period, wherein a current discrete value corresponds to a current sub-symbol interval for a current symbol and a previous discrete value corresponds to a previous sub-symbol interval for the current symbol; and
    a first processing stage, in communication with the input, that estimates symbols for a given user at sub-symbol intervals, wherein a current estimation for the given user estimates a portion of the current discrete value that corresponds to the current symbol for the given user and cancels interference produced by the plurality of users as determined from the previous discrete value during the previous sub-symbol interval.

16. The apparatus of claim 15, wherein the communications system is a code division multiplex access communications system.

17. The apparatus of claim 15, wherein the sub-symbol intervals are chip intervals.

18. The apparatus of claim 15, wherein the first processing stage is one of a plurality of processing stages used to estimate symbols for the given user.

19. The apparatus of claim 15, wherein the processing stage comprises a plurality of processing elements that respectively perform estimations for each of the plurality of users at sub-symbol intervals to accommodate canceling interference produced by the plurality of users.

20. The apparatus of claim 18, wherein the plurality of processing stages includes a first stage and a second stage, the first stage providing an accumulated soft symbol output for the given user to the second stage, the second stage estimating symbols for the given user using the accumulated soft symbol output.

21. The apparatus of claim 15, wherein the first processing stage implements a minimum mean squared error estimate in estimating symbols.

22. The apparatus of claim 21, wherein the minimum mean squared error estimate is a linear mean squared error estimate.

23. The apparatus of claim 15, wherein the first processing stage implements a mixed Gaussian distribution in estimating symbols.

24. The apparatus of claim 18, wherein individual stages from the plurality of processing stages are of different types.

25. The apparatus of claim 18, wherein each processing stage in the plurality of processing stages performs a multi user detection algorithm selected from the group consisting of mixed Gaussian (MG), decoupled Kalman (DK), parallel interference cancellation (PIC), and partial parallel interference cancellation (PPIC).

26. The apparatus of claim 18, wherein each processing stage in the plurality of processing stages includes a recursive multistage demodulator, the recursive multistage demodulator further including gain factor and non-linear function modules that are reconfigurable to provide corresponding processing stages that perform a multi user detection algorithm selected from the group consisting of mixed Gaussian (MG), decoupled Kalman (DK), parallel interference cancellation (PIC), and partial parallel interference cancellation (PPIC).

27. A computer program product for canceling multiple user interference in a communications system wherein a plurality of users communicate over a shared channel, the computer program product stored on a computer readable medium and adapted to perform operations comprising:
    receiving an input that provides a plurality of discrete values produced at sub-symbol intervals that are less than a full symbol period, wherein a current discrete value corresponds to a current sub-symbol interval for a current symbol and a previous discrete value corresponds to a previous sub-symbol interval for the current symbol; and
    estimating symbols for a given user from the plurality of users at sub-symbol intervals, wherein a current estimation for the given user estimates a portion of the current discrete value that corresponds to the current symbol for the given user and cancels interference produced by the plurality of users as determined from the previous discrete value during the previous sub-symbol interval.

28. The computer program product of claim 27, wherein the communications system is a code division multiplex access communications system.

29. The computer program product of claim 27, wherein the sub-symbol intervals are chip intervals.

30. The computer program product of claim 27, wherein the symbols are multiple bit symbols.

31. A method for canceling multiple user interference in a communications system wherein a plurality of users communicate over a shared channel, the method comprising:
    receiving an input that provides a plurality of discrete values produced at sub-symbol intervals that are less than a full symbol period, wherein a current discrete value corresponds to a current sub-symbol interval for a current multiple bit symbol and a previous discrete value corresponds to a previous sub-symbol interval for the current multiple bit symbol; and estimating symbols for a given user from the plurality of users at sub-symbol intervals, wherein a current estimation for the given user estimates a portion of the current discrete value that corresponds to the current multiple bit symbol for the given user and cancels interference produced by the plurality of users as determined from the previous discrete value during the previous sub-symbol interval.

32. The method of claim 31, wherein the communications system is a code division multiplex access communications system.

33. The method of claim 31, wherein the sub-symbol intervals are chip intervals.

34. The method of claim 31, wherein estimating symbols for the given user is performed by a plurality of processing stages.

35. The method of claim 31, wherein a plurality of processing elements respectively perform estimations for each of the plurality of users at sub-symbol intervals to accommodate canceling interference produced by the plurality of users.

36. The method of claim 34, wherein the plurality of processing stages includes a first stage and a second stage, the first stage providing an accumulated soft symbol output for the given user to the second stage, the second stage estimating symbols for the given user using the accumulated soft symbol output.

37. The method of claim 36, wherein the input as received by the second stage is delayed by a symbol period relative to that received by the first stage.

38. The method of claim 31, wherein symbol estimation is based upon one of a minimum mean squared error estimate.

39. The method of claim 38, wherein the minimum mean squared error estimate is a linear mean squared error estimate.

40. The method of claim 31, wherein symbol estimation is based upon a mixed Gaussian distribution.

41. The method of claim 34, wherein individual stages from the plurality of processing stages are of different types.

42. The method of claim 34, wherein each processing stage in the plurality of processing stages performs a multi user detection algorithm selected from the group consisting of mixed Gaussian (MG), decoupled Kalman (DK), parallel interference cancellation (PIC), and partial parallel interference cancellation (PPIC).

43. The method of claim 34, wherein each processing stage in the plurality of processing stages includes a recursive multistage demodulator.

44. The method of claim 43, wherein the recursive multistage demodulator includes gain factor and non-linear function modules that are reconfigurable to allow corresponding processing stages to perform a multi user detection algorithm selected from the group consisting of mixed Gaussian (MG), decoupled Kalman (DK), parallel interference cancellation (PIC), and partial parallel interference cancellation (PPIC).

45. An apparatus for canceling multiple user interference in a communications system wherein a plurality of users communicate over a shared channel, the method comprising:
an input that receives a plurality of discrete values produced at sub-symbol intervals that are less than a full symbol period, wherein a current discrete value corresponds to a current sub-symbol interval for a current multiple bit symbol and a previous discrete value corresponds to a previous sub-symbol interval for the current multiple bit symbol; and
a first processing stage, in communication with the input, that estimates symbols for a given user at sub-symbol intervals, wherein a current estimation for the given user estimates a portion of the current discrete value that corresponds to the current multiple bit symbol for the given user and cancels interference produced by the plurality of users as determined from the previous discrete value during the previous sub-symbol interval.

46. The apparatus of claim 45, wherein the communications system is a code division multiplex access communications system.

47. The apparatus of claim 45, wherein the sub-symbol intervals are chip intervals.

48. The apparatus of claim 45, wherein the first processing stage is one of a plurality of processing stages used to estimate symbols for the given user.

49. The apparatus of claim 45, wherein the processing stage comprises a plurality of processing elements that respectively perform estimations for each of the plurality of users at sub-symbol intervals to accommodate canceling interference produced by the plurality of users.

50. The apparatus of claim 48, wherein the plurality of processing stages includes a first stage and a second stage, the first stage providing an accumulated soft symbol output for the given user to the second stage, the second stage estimating symbols for the given user using the accumulated soft symbol output.

51. The apparatus of claim 45, wherein the first processing stage implements a minimum mean squared error estimate in estimating symbols.

52. The apparatus of claim 51, wherein the minimum mean squared error estimate is a linear mean squared error estimate.

53. The apparatus of claim 45, wherein the first processing stage implements a mixed Gaussian distribution in estimating symbols.

54. The apparatus of claim 48, wherein individual stages from the plurality of processing stages are of different types.

55. The apparatus of claim 48, wherein each processing stage in the plurality of processing stages performs a multi user detection algorithm selected from the group consisting of mixed Gaussian (MG), decoupled Kalman (DK), parallel interference cancellation (PIC), and partial parallel interference cancellation (PPIC).

56. The apparatus of claim 48, wherein each processing stage in the plurality of processing stages includes a recursive multistage demodulator, the recursive multistage demodulator further including gain factor and non-linear function modules that are reconfigurable to provide corresponding processing stages that perform a multi user detection algorithm selected from the group consisting of mixed Gaussian (MG), decoupled Kalman (DK), parallel interference cancellation (PIC), and partial parallel interference cancellation (PPIC).

* * * * *